United States Patent [19]
Balogh et al.

[11] Patent Number: 5,493,677
[45] Date of Patent: Feb. 20, 1996

[54] GENERATION, ARCHIVING, AND RETRIEVAL OF DIGITAL IMAGES WITH EVOKED SUGGESTION-SET CAPTIONS AND NATURAL LANGUAGE INTERFACE

[75] Inventors: Aristotle Balogh, Bowie, Md.; Hatte Blejer, Alexandria, Va.; Eugene Chen, Arlington, Va.; Sharon Flank, Washington, D.C.; Carmen Iannacone, Fairfax, Va.; John Maloney, Upper Marlboro, Md.; Patrick Martin, Arlington, Va.; James Rothey, Fairfax, Va.; Gary Schmid, Arlington, Va.; Linda T. Dozier, Goleta, Calif.; Michael Lorton, San Francisco, Calif.

[73] Assignee: Systems Research & Applications Corporation, Arlington, Va.

[21] Appl. No.: 255,379

[22] Filed: Jun. 8, 1994

[51] Int. Cl.[6] ..................................... G06F 17/30
[52] U.S. Cl. .............. 395/600; 364/419.01; 364/419.02; 364/419.07; 364/419.08; 364/974; 364/963.5; 364/282.1; 364/225.5; 364/DIG. 1; 364/DIG. 2
[58] Field of Search ................................... 395/600, 147; 364/419.01, 419.02, 419.07, 419.08

[56] References Cited

U.S. PATENT DOCUMENTS

| | | | |
|---|---|---|---|
| 4,695,975 | 9/1987 | Bedrij | 395/147 |
| 4,829,423 | 5/1989 | Tennant et al. | 364/419.08 |
| 4,833,610 | 5/1989 | Zamora et al. | 364/419.13 |
| 4,849,898 | 7/1989 | Adi | 364/419.10 |
| 5,109,439 | 4/1992 | Froessi | 382/61 |
| 5,197,005 | 3/1993 | Shwartz et al. | 364/419.13 |
| 5,237,503 | 8/1993 | Bedecarrax et al. | 364/419.08 |
| 5,263,159 | 11/1993 | Mitsui | 395/600 |
| 5,265,014 | 11/1993 | Haddock et al. | 364/419.08 |
| 5,386,556 | 1/1995 | Hedin et al. | 395/600 |

FOREIGN PATENT DOCUMENTS 0597630  5/1994  European Pat. Off. ...... G06F 15/403

Primary Examiner—Thomas G. Black
Assistant Examiner—Paul R. Lintz
Attorney, Agent, or Firm—Stuart P. Meyer

[57] ABSTRACT

Digitized images are associated with English language captions and other data, collectively known as the metadata associated with the images. A natural language processing database removes ambiguities from the metadata, and the images and the metadata are stored in databases. A user formulates a search query, and natural language processing is used to determine matches between the query and the stored metadata. Images corresponding to the matches are then viewed, and desired images are selected for licensing. The license terms for selected images are displayed, and a subset of the selected images are ordered as desired by the user.

14 Claims, 16 Drawing Sheets

GENERATION, ARCHIVING, AND RETRIEVAL OF DIGITAL IMAGES WITH EVOKED SUGGESTION-SET CAPTIONS AND NATURAL LANGUAGE INTERFACE

FIELD OF THE INVENTION

The present invention relates generally to image processing and specifically to archiving and retrieving of images, such as digitized photographs, works of art, or graphic illustrations, by use of a natural language such as English.

DESCRIPTION OF RELATED ART

Numerous schemes have been used in the past for archiving images and selecting images for retrieval from such archives. Before computers became widely available, simple index cards were often used to keep track of stock photographs, and personnel within photo agencies often relied on their own experience to retrieve photographs that corresponded to a potential customer's request.

Such methods of archiving and retrieving stock photographs provided imperfect results, and were difficult, time-consuming and expensive to implement. As image libraries grew, the shortcomings of conventional archiving and retrieval techniques became yet more pronounced.

The advent of photo Compact Disc ("CD") technology allowed certain advances to be made in this field. With CDs, a customer may purchase rights to use a large number of pictures that may be stored on a single disc and selectively browsed using a CD-ROM drive. However, the number of images available on a CD is still somewhat limited, and most CD-based photo portfolios require a relatively large up-front payment for all of the images on the CD, regardless of how many the user may be interested in. Finally, image quality on CD-based photo portfolios is not always production quality.

Some on-line systems have recently become available that include photo CD technology, such as the KODAK PICTURE EXCHANGE ("KPX") and the COMSTOCK BULLETIN BOARD SERVICE. Such services typically include relatively large libraries of images, and permit conventional keyword search techniques. However, none of the known systems provide an easy to use, natural language search capability, nor do they allow for automating the process of pricing, ordering, and delivering selected images.

It would be desirable to allow users to select images from a library based on conceptual characteristics of such images, to obtain immediate pricing information regarding selected images, and to order and obtain production-quality versions of such images directly.

DISCLOSURE OF INVENTION

In accordance with the present invention, images are archived and retrieved by associating metadata with an image, the metadata including bibliographic data, a caption, and a set of suggestions evoked by the image, removing ambiguities from the metadata, storing the image and metadata in a database with other images and metadata, and selecting certain images from the database that have metadata corresponding to a user's search request.

In one aspect of the invention, a natural language processing technique is used in connection with the selection of images based on the user's search request.

In another aspect of the invention, an image is watermarked so as to allow the image to be viewed for selection on a computer monitor, but not to be printed in a usable format or downloaded for digital publishing.

In yet another aspect of the invention, the user may order and obtain delivery of selected images directly over a computer connection.

In still another aspect of the invention, ambiguities in the metadata are removed by highlighting portions of the metadata that are recognized as having multiple senses, providing a list of possible senses for those portions, and allowing the user to select the appropriate sense.

In accordance with the present invention, apparatus (100) for image archive and retrieval includes an ingestion center (110), an image center (120), and user workstations (130–132).

BEST MODE FOR CARRYING OUT THE INVENTION

Figure 1:
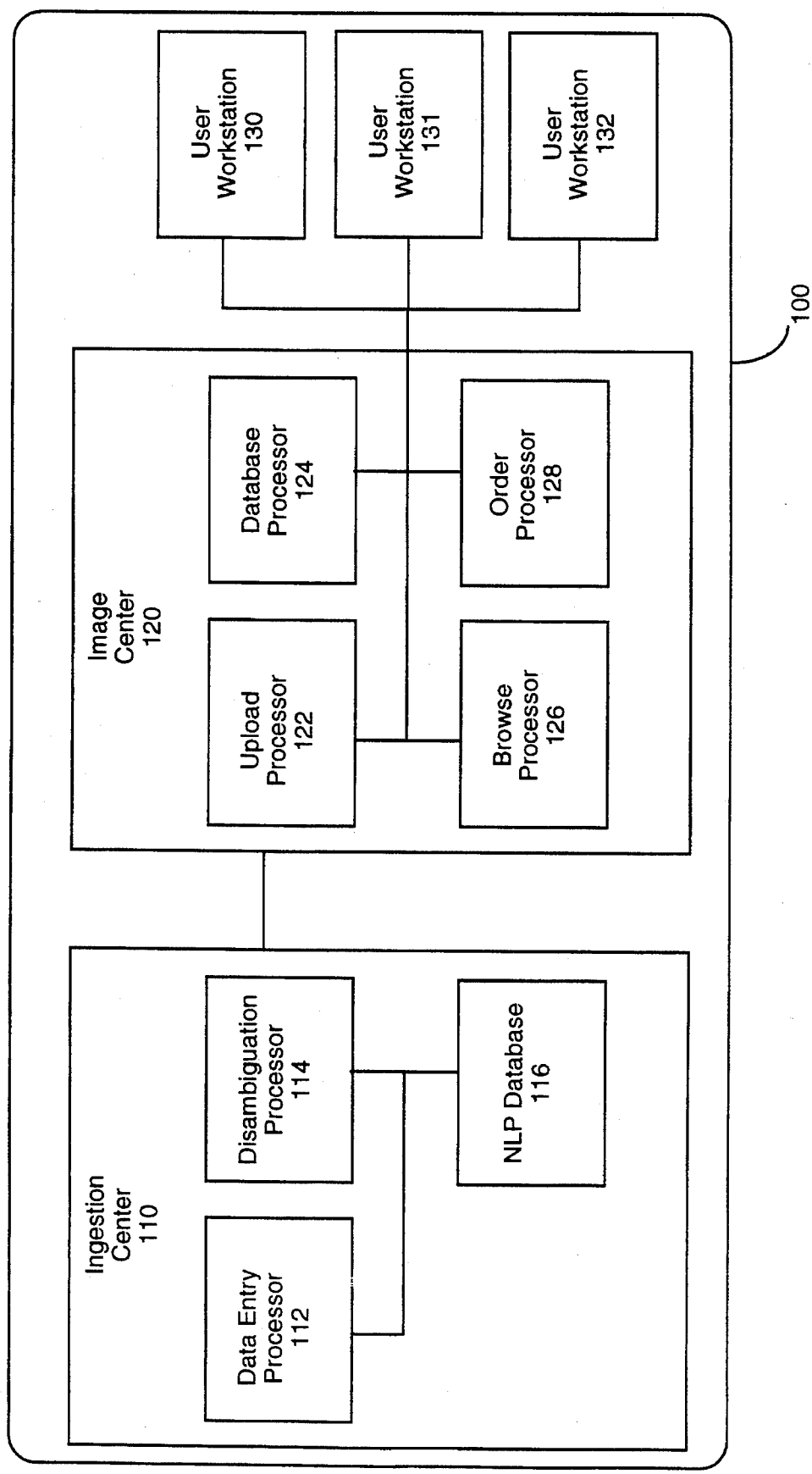
FIG. 1 is a physical block diagram of apparatus for pattern recognition in accordance with the present invention.

Referring now to FIG. 1, there is shown a system 100 for archiving and retrieving images in accordance with the present invention. Briefly, the system 100 is comprised of three major functional blocks. Ingestion center 110 is used to enter images and associated characterizing data (described below as "metadata") into system 100. Image center 120 is used to store the image data and metadata, and to process queries for images based on the metadata. User workstations 130–132 are used to allow remote users to enter queries for images, to view the images sent by image center 120, to obtain pricing information on such images, to order such images, and to obtain delivery of such images.

More specifically, ingestion center 110 includes a data entry processor 112, disambiguation processor 114, and natural language processing ("NLP") database 116. Image and basic bibliographic information provided by stock photography agents are converted into digital format if not provided in that form by the agents, and conventionally input to ingestion center 110 using data entry processor 112. Typically, the basic bibliographic information provided by the agents includes the artist's name, source, copyright holder, location, artist's project name or series, dates, release information, and any notes relating to the photograph supplied by the artist. The data entry processor 112 permits input of the image data and this textual data to 110, and also allows an operator known as a "captioner" to verify the quality of both the image data and the bibliographic data, to write a short caption, or description, of the salient features of the image, and to select certain attributes of the image. The caption may be a set of regular English language sentences, as opposed to merely a listing of unconnected keywords. The attributes may include, for example, the type of image (photograph, computer-generated graphic, video clip or other multimedia object, background pattern, portrait, abstract, aerial, or special effect), predominant hue, and image orientation (landscape or portrait). The captioner also provides as part of the metadata a "suggests" text field describing the emotional suggestions evoked by the image. If not already provided by the photo agency with the bibliographic data, the captioner may obtain and add to the bibliographic data information concerning the prices and other terms under which such image may be licensed. Collectively, the bibliographic data, the caption, the attributes and the suggests field are known as the "metadata" associated with the image.

A disambiguation processor 114 takes as input the metadata of the image and identifies for the captioner any portions of the metadata that are capable of multiple interpretations, based on information previously stored in NLP database 116. The captioner may then select which interpretation is desired, or may enter a new interpretation. The disambiguation processor 114 also serves to standardize the form of the caption, so that all captions use conjunction and disjunction in a standard way, and so that all captions are written in the same anaphoric reference style. Furthermore, if the style of captions is standardized, the location of information within a caption may even provide useful information. If, for example, the most important descriptive information is consistently placed in the first sentence of a caption, that information can be weighted more heavily in making decisions about the relative "closeness" of a query to the caption.

In a preferred embodiment, data entry processor 112, disambiguation processor 114, and NLP database 116 are implemented using conventional client/server computer systems, with client workstations being personal computers such as the APPLE MACINTOSH or IBM-compatible personal computers and servers being conventional computers such as the SUN SPARCSTATION.

Memory map B-trees are used to implement NLP database 116, as described in R. Sedgewick, ALGORITHMS IN C++, Reading, Mass.: Addison-Wesley (1992), the teachings of which are incorporated herein by reference. NLP database 116 contains information about words, their senses, and how those senses are linked together. Word senses are represented as unique numbers. An "expansions" portion of NLP database 116 represents each link as a database record incorporating (i) the word sense, represented by a unique number, (ii) a word sense to which the sense in (i) is linked, represented by another unique number, and (iii) the type of link between the senses in (i) and (ii), e.g., "synonym", "antonym", "a kind of", "a part of."

The primary components of image center 120 include upload processor 122, database processor 124, browse processor 126, and order processor 128. Upload processor 122 is used to take the image and metadata information from ingestion center 110 and store it in a form usable by database processor 124. Database processor 124 stores images and metadata for use by browse processor 126 and order processor 128, and also archives image data for long-term storage. In a preferred embodiment, database processor stores images in three separate resolutions for "thumbnail", quarter-sized, and full-sized display as desired, and uses VHS-type videotape as the medium for archiving full-resolution images. Browse processor 126 permits a user to see both image data and metadata for selected images, and order processor 128 permits the user to learn pricing information for such images, to order such images, and to obtain delivery of such images. In a preferred embodiment, processors 122–128 are implemented using conventional client/server architecture as described above in connection with the components of ingestion center 110.

User workstations 130–132 permit users of system 100 to access the image center 120 for the purpose of posting image queries, for reviewing the results of such queries, for selecting images to order, for completing ordering transactions, and for receiving print-quality images. For purposes of illustration, three user workstations 130–132 are shown but it should be recognized that any number of such workstations may be used in accordance with the invention. In a preferred embodiment, workstations 130–132 are implemented using conventional personal computers such as described above in connection with the client computers of ingestion center 110, programmed to provide the functionality described herein.

The components of system 100 illustrated in FIG. 1 are further described below in connection with the other figures.

Figure 2:
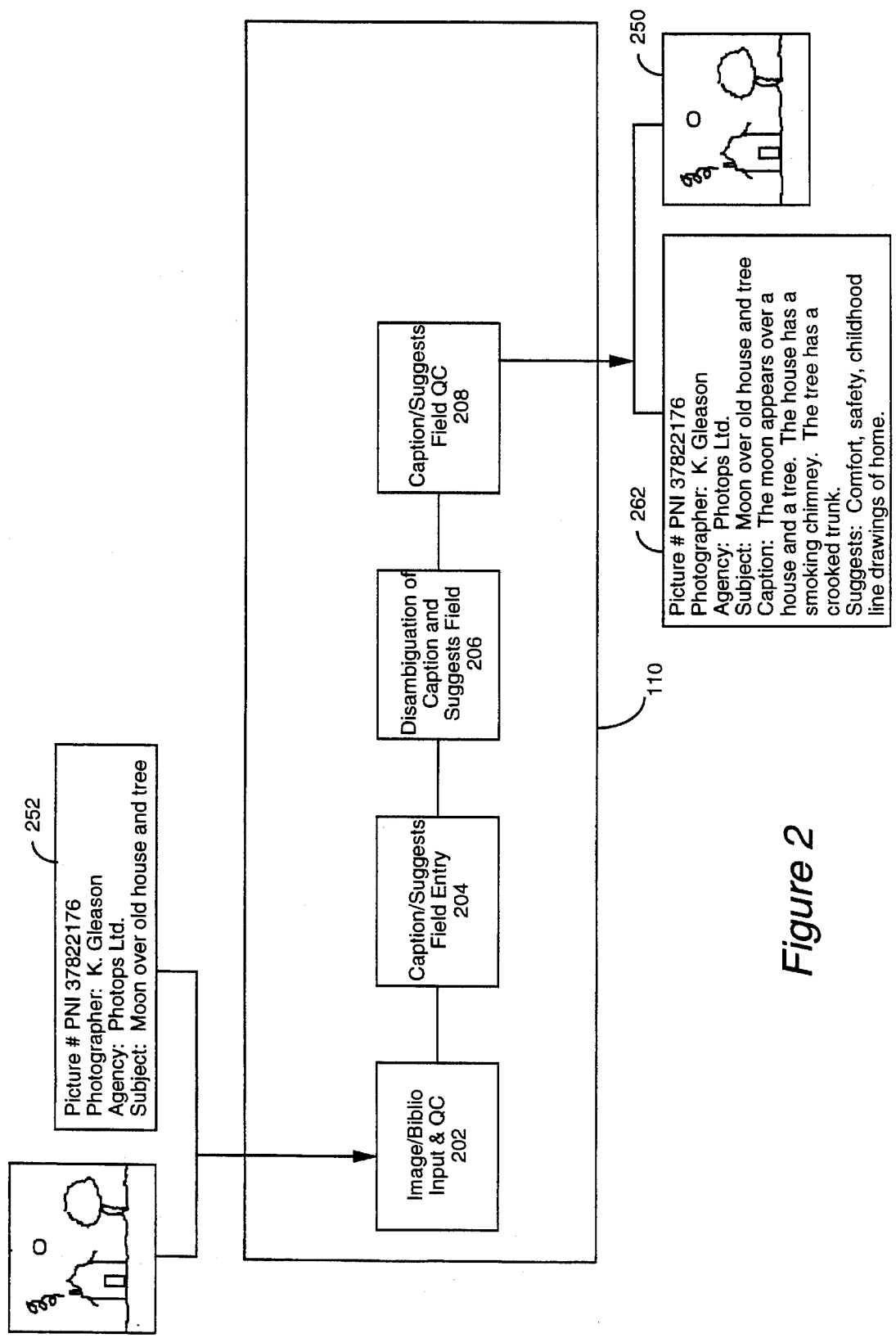
FIG. 2 is a functional block diagram of the ingestion center portion of the apparatus of FIG. 1, in accordance with the present invention.

Referring now also to FIG. 2, there is shown a functional block diagram of ingestion center 110. In operation, a digitized picture 250 and bibliographic data 252 (shown in simplified form in FIG. 2) are applied to an image/bibliographic input and quality control service 202. Service 202, implemented primarily by data entry processor 112, permits input of the image and agency-supplied bibliographic data into system 100. Service 202 also displays the image and data so that a captioner may perform quality control to ensure that the image is right-side up and in focus, that the colors are correct, and that the bibliographic data 252 was scanned or otherwise input correctly and matches the image 250.

After processing by service 202 is complete, the image and bibliographic data are applied to a caption/suggests field entry service 204. This service 204 permits a captioner to enter the caption and suggests field information as described in connection with FIG. 1. In a preferred embodiment, service 204 is implemented using data entry processor disambiguation processor 114, but other processors, e.g., data entry processor 112, could also provide this functionality.

The data are next applied to a disambiguation of caption and suggests field tool 206. This tool 206 provides processing, described in greater detail in connection with FIG. 4, that checks the spelling of words in the bibliographic data, allows for supplementation of information in the bibliographic data (e.g., to provide more complete location information), "tags" words in the caption and suggests field as being particular parts of speech, checks the spelling of words in the caption and suggests field, links logically connected adjacent words in the captions and suggests field as "multiwords" (e.g., "United States" and "home run"), and removes ambiguities from the caption and the suggests field by allowing the captioner to select a word sense that most closely matches the concept or intended meaning of any particular word in the context. For instance, the word "crane" has both noun and verb meanings, and the noun meaning is also ambiguous between a "heavy equipment" sense and a "bird" sense. The captioner is presented with a list of possible senses and asked to indicate which sense is intended. From that point on, the word is marked with the intended sense so that requests for images related to the other senses of the word do not pull up that image.

The disambiguation tool 206 uses a semantic net of word senses, including a hierarchy of synonyms and related words. This net acts as a thesaurus to link related words in both the disambiguation service 206 and in the image center 120 so that even if the end user does not request "crane", but instead requests "heron", images captioned using the bird sense of crane may be retrieved.

Figure 4:
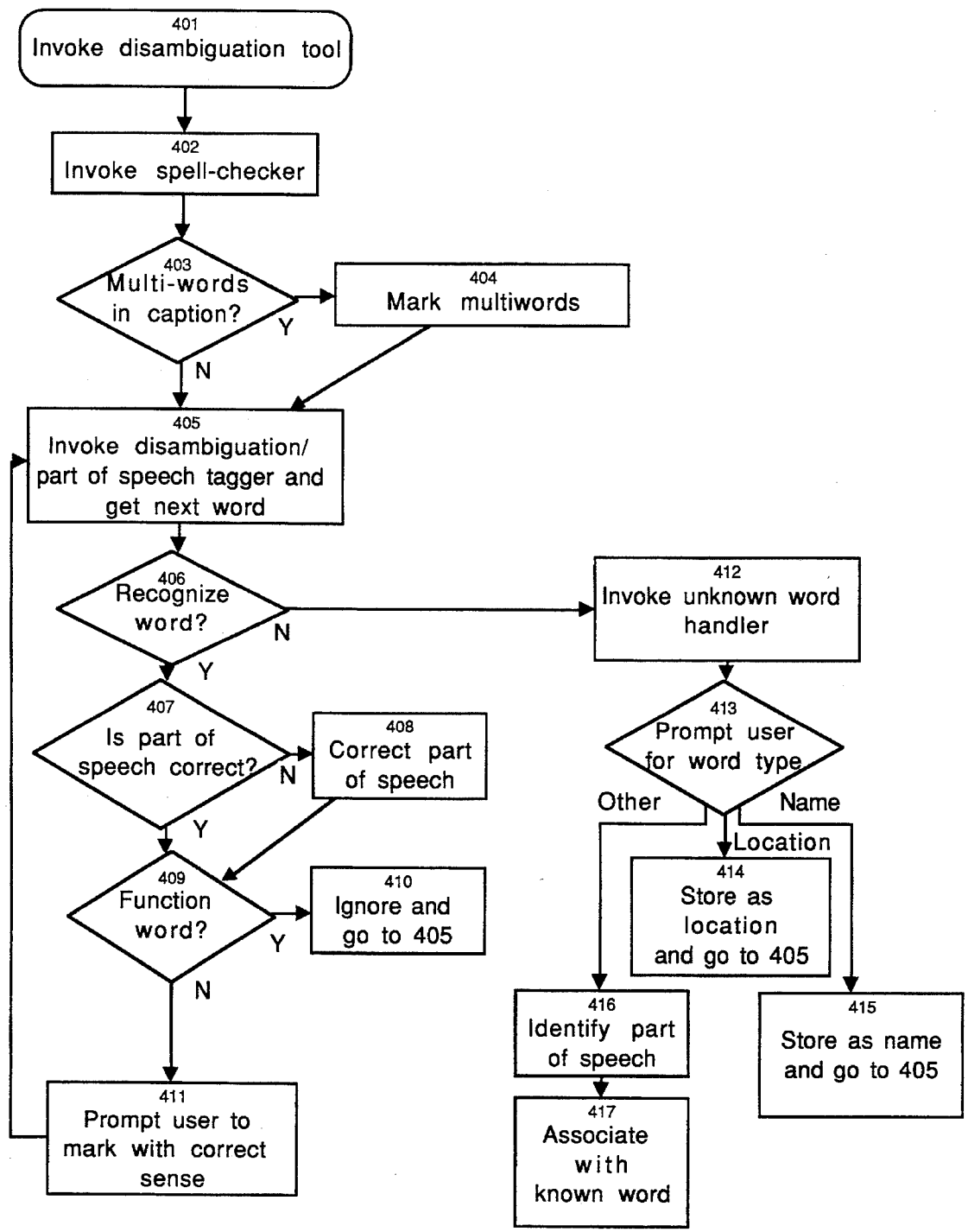
FIG. 4 is a flow diagram illustrating disambiguation processing, in accordance with the present invention.

The disambiguation tool 206 permits a captioner to add new words and new senses to the semantic net. In a preferred embodiment, disambiguation tool 206 is implemented using disambiguation processor 114 and NLP database 116. Referring now also to FIG. 4, greater detail is provided concerning the data flow of disambiguation tool 206.

The data with ambiguities removed is next applied to captions/suggests field quality control service 208, wherein the captioner is provided with an opportunity to again check the accuracy of the caption and suggests field information. In a preferred embodiment, caption/suggests field quality control service is also implemented using disambiguation processor 114.

Figure 6:
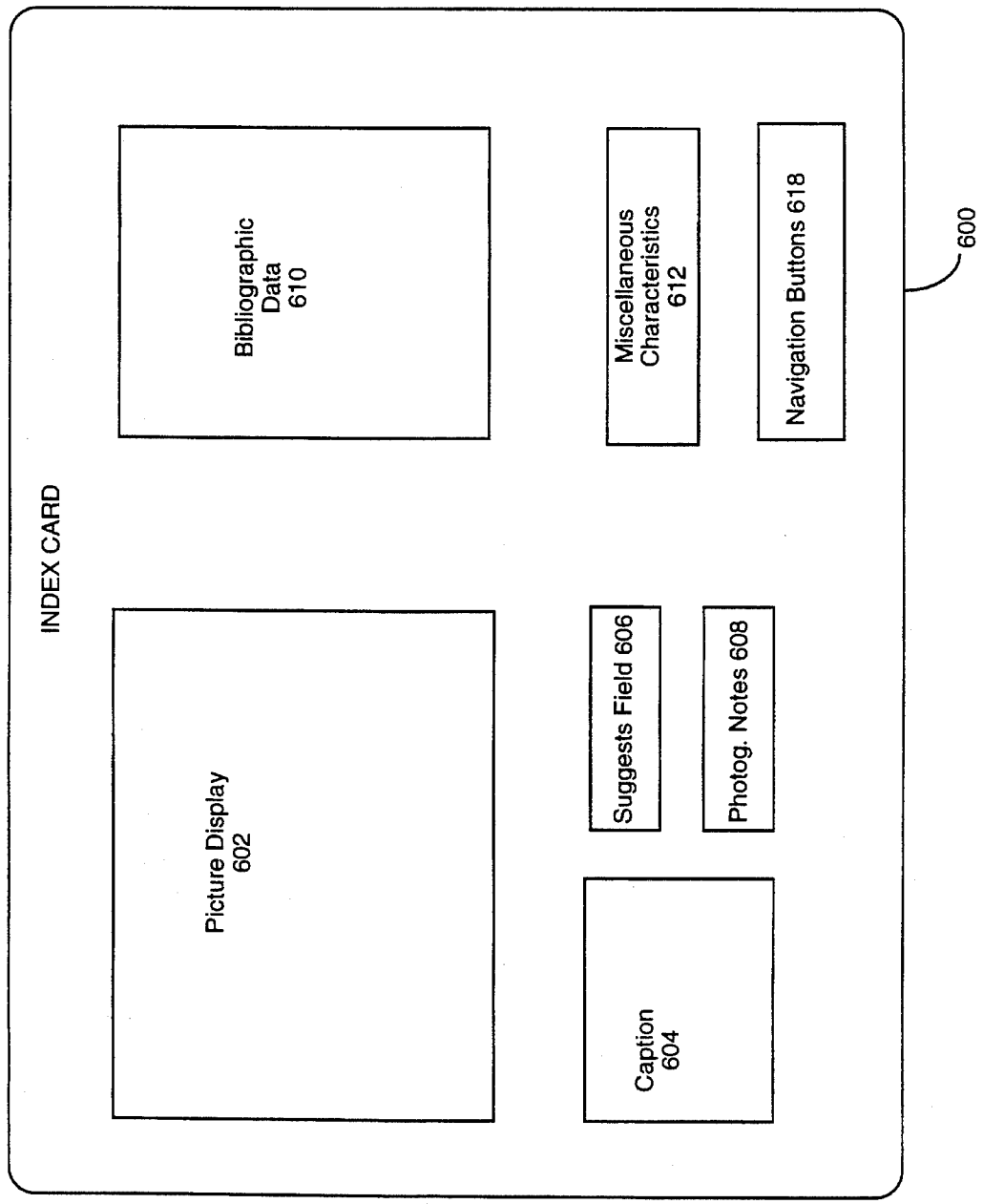
FIG. 6 illustrates an index card screen used in conjunction with the ingestion center portion of the apparatus of FIG. 1, in accordance with the present invention.

Referring now to FIG. 6, there is shown an index card screen 600 by which data entry for the quality control services 202, 208 and caption/suggests field entry services 204 may be accomplished. Index card screen 600 displays image 250 in a picture display area 602, allows the captioner to review and modify bibliographic data in bibliographic data area 610, allows the captioner to add or review a caption in caption area 604, allows the captioner to add or revise suggests field information in suggests field area 606, and allows the captioner to add or revise photographer's notes in photographer's notes area 608. Screen 600 also provides an area 612 in which the captioner may specify the image characteristics (e.g., predominant hue, type of image). Furthermore, screen 600 provides a set of navigation buttons 618 by which the captioner may move among images, reject an image that is of faulty quality, or change default values for the data. In a preferred embodiment, screen 600 is implemented to operate in conjunction in the conventional windowing environment of a UNIX workstation such as a SUN SPARCSTATION or an IBM model RS6000 workstation. In a preferred embodiment, a separate screen similar to screen 600 is used for data entry and correction of pricing and delivery information for images, but it should be recognized that this information could be provided on screen 600 if desired.

Figure 7:
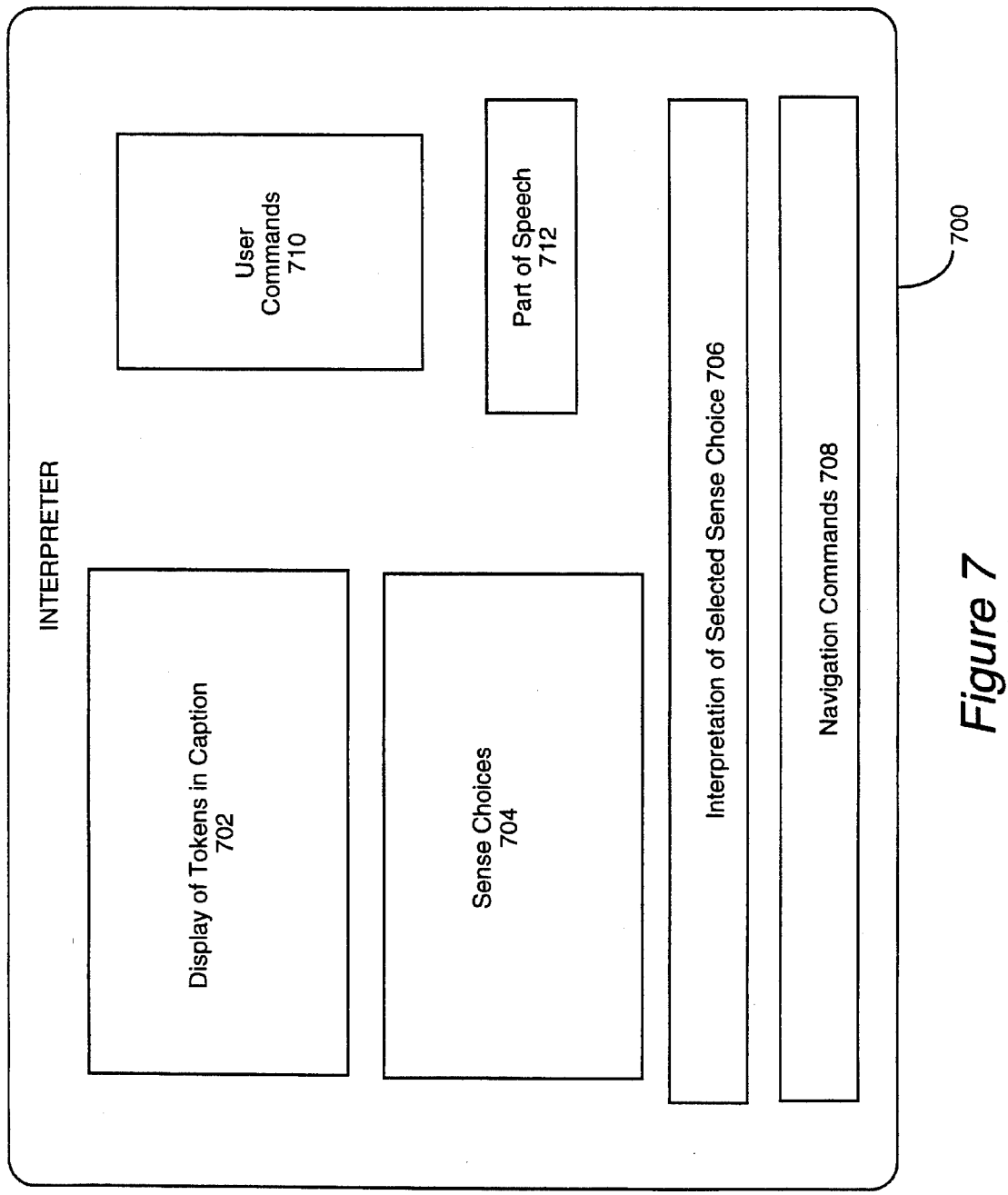
FIG. 7 illustrates an interpreter screen used in conjunction with the ingestion center portion of the apparatus of FIG. 1, in accordance with the present invention.

Referring now to FIG. 7, there is shown an interpreter screen 700 that is presented to the captioner when the disambiguation tool 206 is invoked by the captioner's selection of a "next" choice from navigation buttons 618 on screen 600. Interpreter screen 700 includes an area 702 for display of tokens, or words, in a caption, an area 704 for display of the various sense choices known in NLP database 116 for a selected word in display area 702, an area 706 for more detailed interpretation of a selected one of the sense choices that is displayed in area 704, and an area 712 for display of the part of speech of the selected token. A user commands area 710 displays button choices that the captioner may invoke to add or subtract information, to form or break multiwords, and to add new sense definitions. A navigation commands area 708 displays button choices that the captioner may invoke to finalize disambiguation selections, to ignore tokens that are flagged as being potentially ambiguous, or to finish or cancel a session. In operation, the caption displayed in the tokens area may include a number of words that the disambiguation tool determines to be ambiguous, and may also mark selected groups of words as multiword candidates.

Referring now also to FIG. 4, the process of disambiguation corresponding to the screens in FIGS. 6 and 7 begins by invoking 401 the disambiguation tool 206. A conventional spell-checker is then invoked 402 to correct any spelling errors that appear in the caption. Next, a check 403 is made to determine whether the caption contains any likely multiwords. If so, the multiwords are marked 404 by the captioner underlining them on screen 600. In one embodiment, the ingestion center 110 automatically provides suggestions for multiwords and provides the captioner an opportunity to modify those selections as desired. For example, a caption may include the term "blue collar", and it is up to the captioner to determine whether this term merely describes the color of a shirt collar and should therefore be considered as two separate words, or whether it relates to manual labor, in which case it should be considered as a multiword. The system may at times present a large number of choices for multiwords. For example, if the caption includes "Mt. Rushmore National Park, South Dakota", a number of possible multiwords may be presented, ranging from no multiwords, to a combination of the multiwords "Mt. Rushmore", "National Park", and "South Dakota", to a large single multiword containing the entire phrase. The proper selection is left to the captioner's discretion, and should be made in a manner that will be most helpful in searching for images. In the above example, one likely selection would be of the multiwords "Mt. Rushmore National Park" and "South Dakota".

Processing then invokes 405 a disambiguation/part of speech tagger and allows the captioner to select a word for processing. A check 406 is made to determine whether the selected word is recognized, i.e., is known by the NLP database 116. If not, an unknown word handler is invoked 412 so that the disambiguation tool 206 enters a learning mode, and the captioner is prompted 413 to enter the word type, i.e., a proper name, a location, or other. In a preferred embodiment, unknown words of a caption are immediately displayed using a different color, e.g., red, from recognized words to ensure that the captioner provides such unrecognized words with special attention. In typical operation of the preferred embodiment, all words in a caption and in a suggests field are selected by the captioner for disambiguation, but it should be recognized that operation in which only some words are so processed is also possible.

If the captioner indicates that the type of the unknown word is a name, the word is stored 415 as a name in the NLP database 116, and processing returns to 405 for disambiguation of subsequent words in the caption. If the word type is a location, the word is stored 414 as a location in the NLP database 116, and processing returns to 405 for disambiguation of subsequent words in the caption. If the captioner indicated any other word type, the captioner is prompted to identify 416 the part of speech of the word (e.g., noun, verb, adjective, adverb, date, keyword, helping word) and to associate 417 the word with a word that is known by the NLP database 116. Keywords are acronyms, company names, newly-defined terms in common usage, slang, and words that do not fall into the other categories. Examples of keywords might be names of musical groups such as "Peter, Paul & Mary" and of cultural movements such as "New Age" or "grunge". Helping (or "function") words are determiners such as prepositions, conjunctions and possessive pronouns when used in a manner that would not assist in image searching. For instance, a caption that reads "A boy runs past a house" should have the word "past" marked as a helping word.

In a preferred embodiment, three types of associations are provided for unknown words. The first, a "kind of" association, links genus terms with species terms. For instance, Halloween is a "kind of" holiday. The second type of association is a synonym association. For instance, the words "trauma" and "shock" may be linked in this manner. The third type of association is a "sister term" association, and is used to link two species within the same genus. For instance, the multiword terms "tank top" and "tee shirt" would be linked as sister terms. This information is used to determine the unknown word's placement in NLP database 116. For instance, if NLP database 116 already recognizes "tank top" as a kind of shirt, linking "tee shirt" as a sister term for "tank top" establishes tee shirt" as also being a kind of shirt. It should be recognized that additional or other types of associations may be provided.

The captioner may use the information stored in NLP database 116 as a dictionary or thesaurus by free associating other possible words with the unknown word in interpretation area 706. Once the captioner has typed in a proposed associated word that is recognized as being in NLP database 116, the disambiguation tool will allow that proposed associated word to be the sense with which the unknown word is tagged. For instance, if the word "biker" appears in a caption and is unknown in NLP database 116, the captioner may try free associating the term "bicyclist". If that term is unknown as well, the captioner may try the term "cyclist." If cyclist is in the NLP database 116, the captioner can choose that "biker" be tagged with the sense "cyclist" in that caption. Image searching can also be enhanced by free associating proper names or dates with other terms in NLP database 116. For example, the captioner may associate the proper name "Abraham Lincoln" with the noun "president". Similarly, nouns may be associated with verbs, for instance "explosion" with "combust". As a more complete example, the captioner may mark the words "boat people" as a multiword, indicate that the part of speech is a noun, and associate this multiword with the known term "refugees".

All of the new information provided by the captioner while disambiguation tool is in a learning mode is recorded in a log for future use in disambiguation and, once uploaded to image center 120, for use in image searching.

If check 406 indicates that the word is recognized in the NLP database 116, then a check 407 is made to determine whether the part of speech assumed by disambiguation tool 206 for the word is correct. This check 407 is accomplished by prompting the captioner to indicate whether there is an error in the assumed part of speech, which is conventionally determined by word order and statistical information concerning usage of each word. If there is an error, the captioner indicates 408 the correct part of speech. If the part of speech is determined 409 to be as a function (or "helping") word, the word is ignored 410 for purposes of disambiguation and processing returns to 405. A function word, as opposed to a content word, is a word that only links together or supports words that describe things, actions, and properties. For example, content words would include "house", "walk" or "crooked", while function words would include "the", "and", "could", and "if". If the word is not a function word, the captioner is prompted 411 to indicate the correct sense of the word and thereby mark that instance of the word with the desired sense. This prompting 411 takes place even if the NLP database 116 is currently aware of only one sense of the word, in order to give the captioner an opportunity to add a new sense for that word to the NLP database 116.

Disambiguation tool 206 is implemented in a preferred embodiment in a conventional manner using disambiguation processor 114 and NLP database 116. Further information on known techniques of natural language processing for text-only retrieval systems are found, for example, in T. Strzalkowski and B. Vauthey, *Information Retrieval Using Robust Natural Language Processing,* PROCEEDINGS OF THE 30TH ANNUAL MEETING OF THE ASSOCIATION FOR COMPUTATIONAL LINGUISTICS, 28 Jun.–2 Jul. 1992, Newark, Del., pp. 104–111; P. Nelson, *Site Report for the Text REtrieval Conference,* TREC: The First Text REtrieval Conference (TREC-1), D. K. Harman, ed., Computer Systems Laboratory, National Institute of Standards and Technology, Gaithersburg, Md., NIST Special Publication 500–207 (hereinafter, "TREC"), pp. 287–296 (1993); D. Evans, et al., *CLARIT TREC Design, Experiments, and Results,* TREC, pp. 251–286 (1993); T. Strzalkowski, *Natural Language Processing in Large-Scale Text Retrieval Tasks,* TREC, pp. 173–187 (1993); S. Abney, *Parsing by Chunks,* PRINCIPLE-BASED PARSING: COMPUTATION AND PSYCHOLINGUISTICS, Berwick et al., eds., Dordrecht: Kluwer Academic Publishers, pp. 257–78 (1991), the teachings of which are incorporated herein by reference.

In a preferred embodiment, each word sense is represented using a unique identifying number. An ambiguous word, such as "crane", may have several senses, and disambiguation refers to selecting the correct sense in a particular context or, in other words, discarding those senses of the word that are not appropriate in the current context. It should be recognized that this disambiguation may be performed either manually, i.e., with the captioner selecting a proper sense for each word, or may be performed automatically, e.g., with a system that uses statistical information to select the most likely sense in a given context.

The output of ingestion center 110 includes image 250 and metadata 262 and may, as desired, be in the form of a data stream on a bus connecting ingestion center 110 to image center 120, or may be written onto storage media such as magnetic or optical disks or tapes.

Figure 3:
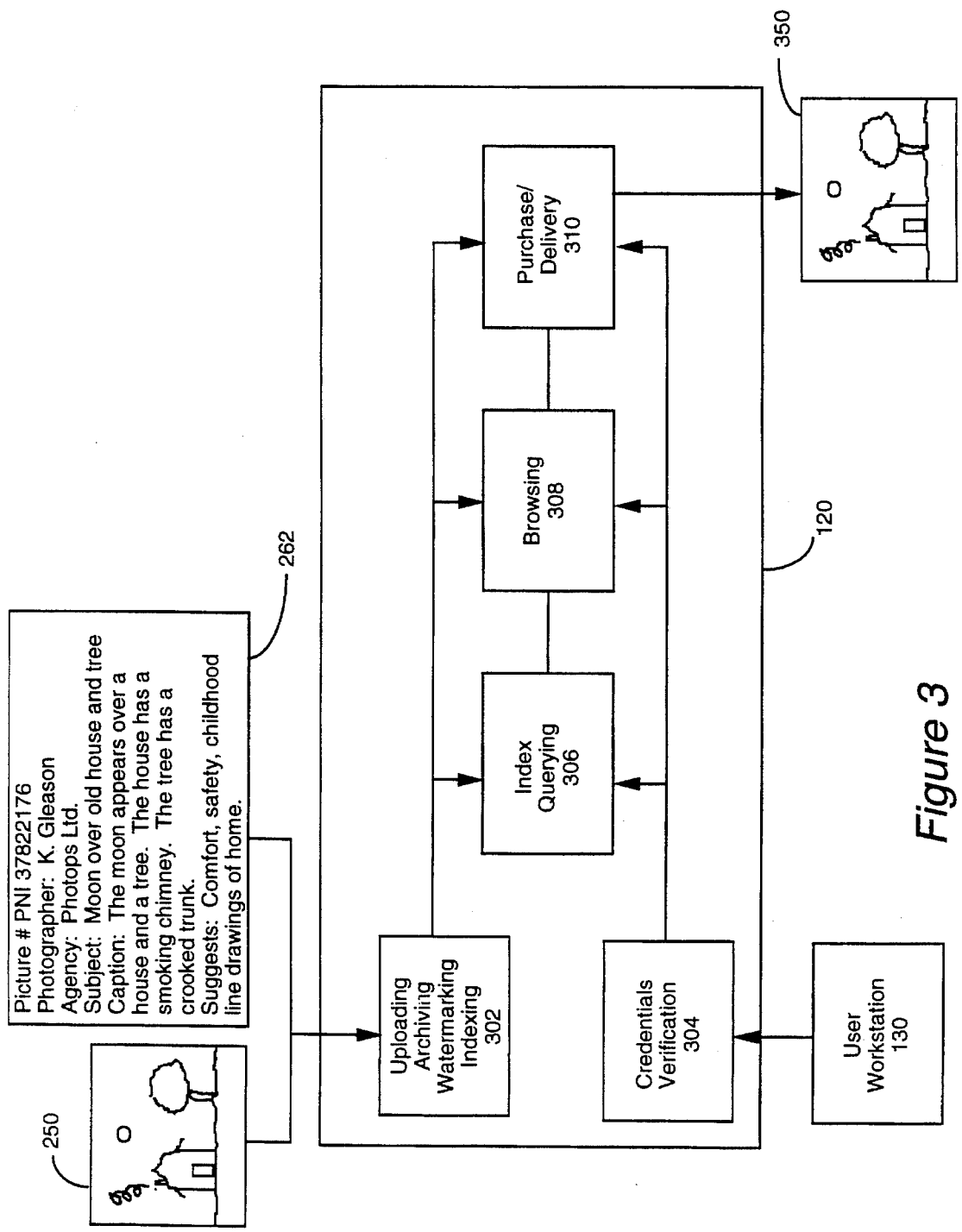
FIG. 3 is a functional block diagram of the image center portion of the apparatus of FIG. 1, in accordance with the present invention.

Referring now to FIG. 3, there is shown a functional block diagram of image center 120. Image 250 and metadata 262 are applied to uploading, archiving, watermarking and indexing service 302 for initial processing. Service 302 transfers full-resolution images, e.g., 250 for long-term storage onto a conventional medium such as magnetic tape; generates browse-resolution images, watermarks such images and stores them for browsing service 308; stores metadata and any additions to the semantic net resulting from disambiguation for index querying service 306, and stores licensing and pricing information for use by purchase and delivery service 310 to permit on-line delivery of a full-resolution image 350. In a preferred embodiment, separate databases within database processor 124 are used to provide such storage, but it should be recognized that any conventional storage scheme could be used for storage of the browse-resolution images, the metadata, the semantic net information, and the licensing and pricing information.

Still referring to FIG. 3, a user workstation, e.g., 130, communicates with image center 120 by connection to credentials verification service 304. Service 304 verifies an user's credentials by checking an input user identification number, organization identification number, user name, and password. Users are assigned a permission level to indicate whether they are authorized only to search for images or to both search for and purchase rights to images. Service 304 also maintains audit trails of system usage, such as connect time and login attempts, both for billing purposes and for tracing attempted unauthorized use of system 100. In a preferred embodiment, credentials verification service 304 is implemented partially on user workstation 130 and partially on image center 120, specifically database processor 124. It should be recognized, however, that other equivalent implementations could be used to achieve the function of credentials verification service 304. In an alternative embodiment, service 304 provides users with access to only a subset of the available images. Such limited access might be based on different archive groupings, e.g., for various image price levels or for certain photo agencies.

Figure 8:
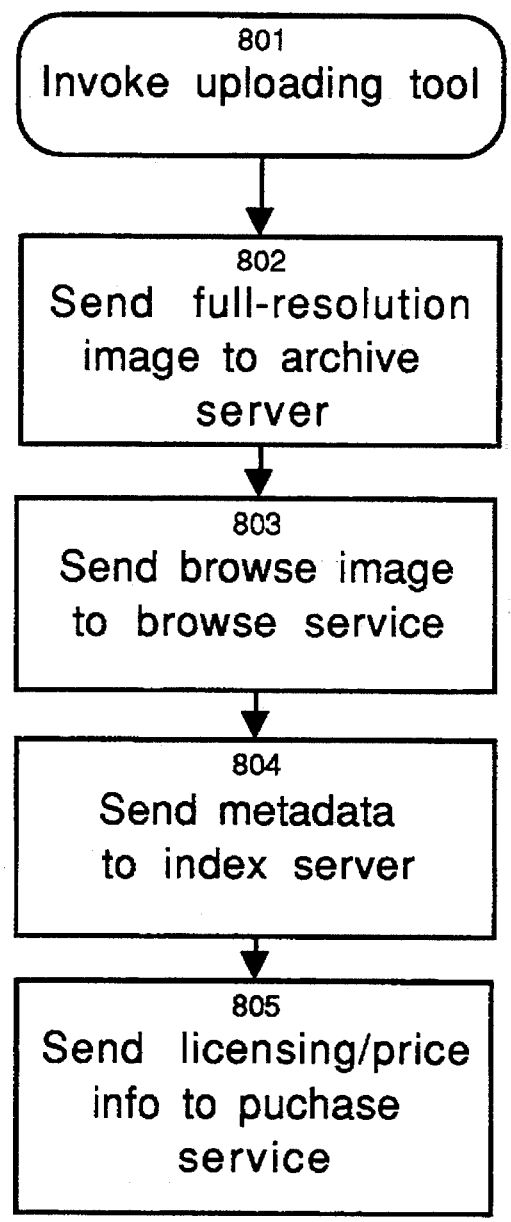
FIG. 8 is a flow diagram of upload processing, in accordance with the present invention.

The uploading portion of the operation of uploading, archiving, watermarking, and indexing service 302 is described in the flow diagram of FIG. 8. Processing starts by invoking 801 an uploading tool to control subsequent processing. Next, the full-resolution version of an image to be uploaded is sent 802 to an archiving server, which is in a preferred embodiment a part of database processor 124. As previously described, the full-resolution image is stored for archiving purposes on a medium such as magnetic tape. The browse-resolution image is then sent 803 to browsing service 308. In a preferred embodiment, browsing service 308 is implemented using both browse processor 126 and database processor 124 and the browse image data are stored in database processor 124, but it should be recognized that other architectures could be used as well. Next, metadata are sent 804 to index querying service 306. In a preferred embodiment, index querying service 306 is implemented using both browse processor 126 and database processor 124 and the index image data are stored in database processor 124, but it should be recognized that other architectures could be used as well. Finally, licensing and pricing information are sent 805 to purchase/delivery service 310. In a preferred embodiment, purchase/delivery service 310 is implemented using both order processor 128 and database processor 124, but it should be recognized that other architectures could be used as well.

Figure 9:
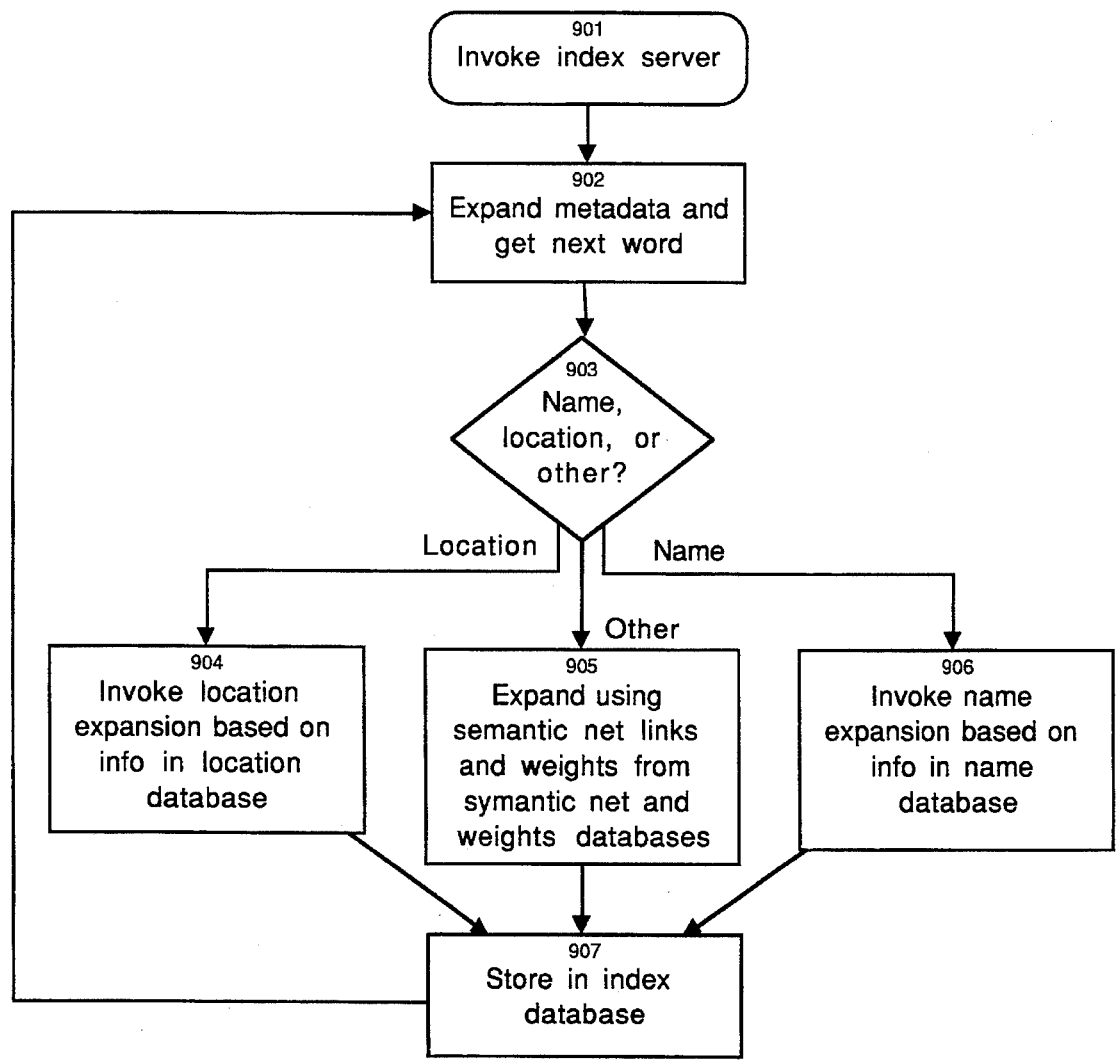
FIG. 9 is a flow diagram of index server upload processing, in accordance with the present invention.

Referring now to FIG. 9, there is shown in greater detail how metadata are uploaded to index querying service 306. Processing begins by invoking 901 an index service upload process, which controls further processing flow. Next, the metadata for a current image are expanded and the next portion of the metadata are obtained. Specifically, each word is looked up, words that may be related are found based on stored links, and the looked-up word, along with any related words are displayed as the "expansion" of that word. Then, a check 903 is made to determine whether the current portion of data (e.g., the current word) corresponds to a proper name, a location, or something else. If the current portion corresponds to a name, a name expansion process is invoked 906 that displays the name and related names such as nicknames and other variants, based on linked name information already stored in a name database portion of database processor 124. If the current portion corresponds to a location, a location expansion process is invoked 904 that displays the location and related locations, such as "Arlington, Virginia" and "Arlington, Massachusetts" for "Arlington", based on linked location information already stored in a location database portion of database processor 124. If the current portion corresponds to neither a name nor a location, the portion is expanded 905 as explained above using semantic net links and weights based on information stored in semantic net link and weights portions of database processor 124. Strongly related concepts are given high weights, while more remotely related concepts are given lower weights, marking them as less exact matches. Thus, for a query on "car," captions containing "car" and "automobile" are listed highest, followed by those with "sedan," "coupe," and "convertible," and then by more remotely related concepts such as "transmission," "hood," and "trunk". In a preferred embodiment, four factors are used for weighting. First, the type of relationship (e.g., synonym, a kind of, a part of) is considered. Second, the closeness of the relationship, as determined by the number of links forming the relationship, is used. For example, the words "content" and "overjoyed" may be linked because "content" is linked as a synonym of "happy", which is in turn linked as a synonym of "joyous", which is in turn linked as a synonym of "overjoyed", but this relationship is not weighted strongly because three links are required to establish the relationship. Syntactic relations and word position within a caption are the final two factors. The head of a noun phrase is weighted more highly than modifiers, and nouns are weighted more highly than verbs. Words positioned at the beginning of the caption receive more weight than those later in the caption, and those in the first sentence of a caption are deemed more significant than those in subsequent sentences.

In any event, once the appropriate expansion is complete, the current portion of the metadata is stored 907 in an index database portion of database processor 124, is available for use in image searching as described below, and processing returns to 902 for the next portion of the metadata.

Figure 5:
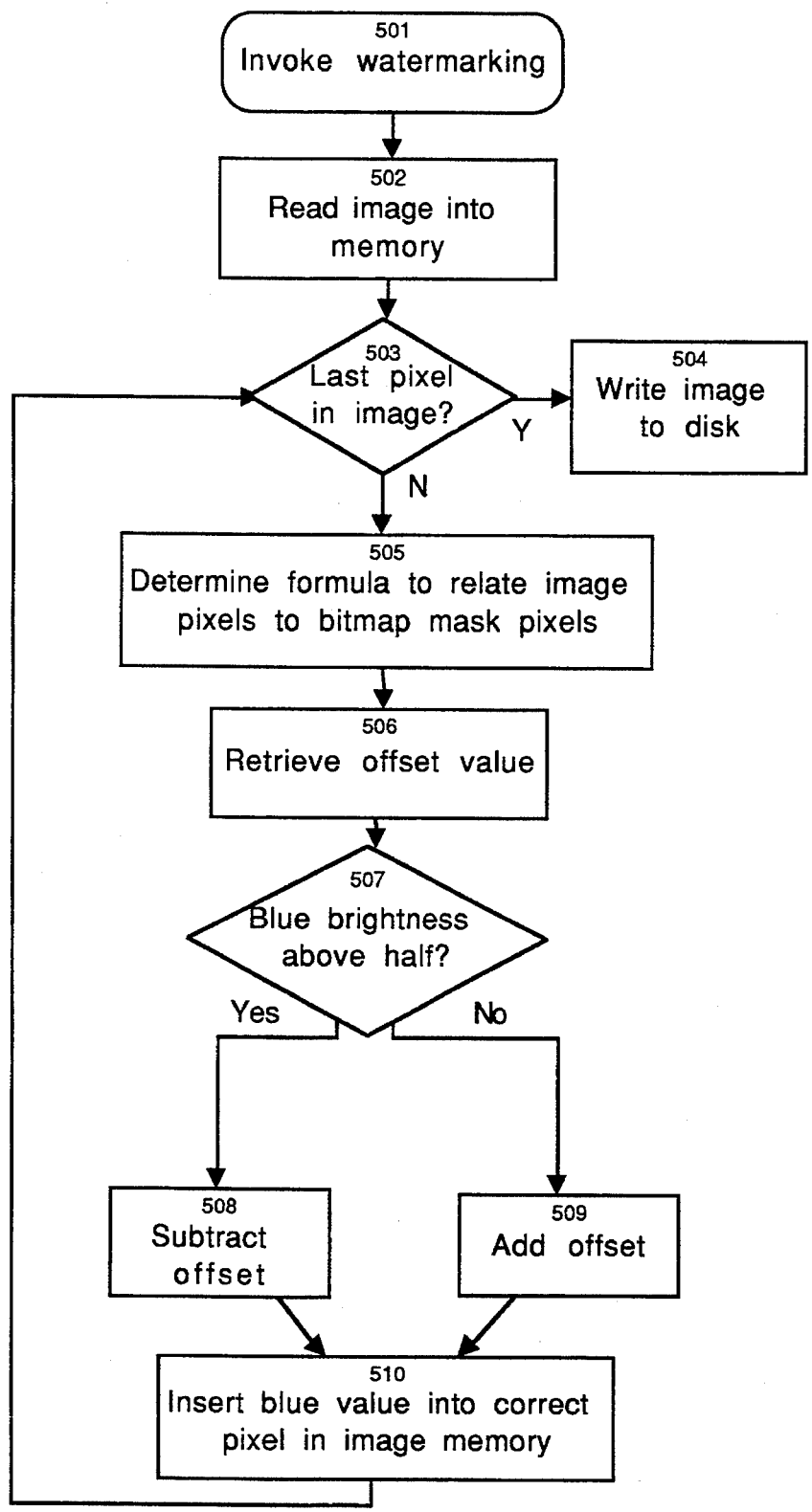
FIG. 5 is a flow diagram illustrating watermarking, in accordance with the present invention.

Uploading, archiving, watermarking, and indexing service 302 watermarks an image by overlaying the digital representation of an image with a digital watermark in a manner that allows the image to be viewed without obstruction on a computer monitor, but that prevents high-quality printout of the image and thereby prevents unlicensed use of images. Specifically, a mask corresponding to the shape of the watermark is "tiled" over the image to be marked, and the blue component (in the RGB color space) of those pixels of the image that overlap with the watermark are altered. The manner in which those pixels are altered results in an image that appears unchanged when viewed in low resolution on a computer monitor, but appears corrupted by the watermark when printed. Referring now also to FIG. 5, the watermarking operation is described in greater detail. When watermarking is invoked 501, the image to be watermarked is read 502 into memory. Once the image is read 502, a pixel from the image is obtained and a check 503 is performed to determine whether the current pixel is the last one in the image. If so, the image is written 504 to disk storage. Next, a formula is employed to determine 505 how the watermark will be positioned with respect to the image. In other words, a formula is employed to determine 505 whether any particular pixel from the image is to be corrupted by the watermark. If x and y represent, respectively, horizontal and vertical positions in an original image, and if a and b represent, respectively, vertical and horizontal positions in bitmap masks, and if watermark_height and watermark_width represent, respectively, the height and width of the watermark image in pixels, then in one embodiment, the formula used to determine the image pixel to bitmap pixel transformation is:

$$a = y \text{ modulus watermark\_height}$$
$$b = x \text{ modulus watermark\_width} \qquad \text{Eq. 1}$$

If equation 1 results in a determination that the current pixel is to be corrupted by the watermark, the pixel is modified by altering the blue component of the pixel in the RGB color space by a certain "offset" value. The offset depends on the brightness of the pixel. In one embodiment, the offset is retrieved 506 by use of the equation:

$$\text{offset} = (\text{Brightness} * \text{MaxOffset})/\text{MaxBrightness} + \text{MinOffset} \qquad (\text{Eq. 2})$$

where Brightness is the blue value of the pixel, MaxOffset is a constant that in this embodiment is set at 40, MaxBrightness is a maximum image brightness, usually 255, and MinOffset is a constant that in this embodiment is set at 10.

Once the offset is retrieved 506, a check 507 is performed to determine whether the brightness of the current pixel (i.e., the value of the blue component of the pixel) is above or below half of the maximum. If this blue brightness is over half, then the pixel is modified by subtracting 508 the offset value from the blue brightness value for that pixel. If this blue brightness is under half, then the pixel is modified by adding 509 the offset value to the blue brightness value. Either way, the modified blue value is then stored 510 in image memory for the current pixel, and processing flows back to check 503 to begin again for the next pixel. Thus, the watermark will stand out by being bright on a dark background and darker on a bright background. While this variation is only minimally perceptible when the image is viewed on a computer monitor based on an RGB color space, when the image is converted to CMYK color space for printing or other processing, the modifications to the blue intensity become vividly apparent in the yellow layer of such CMYK-based reproduction. Thus, the watermark allows virtually unnoticeable reproduction of an image on a computer monitor but prevents usable color hardcopy from being generated by the watermarked image.

Figure 10:
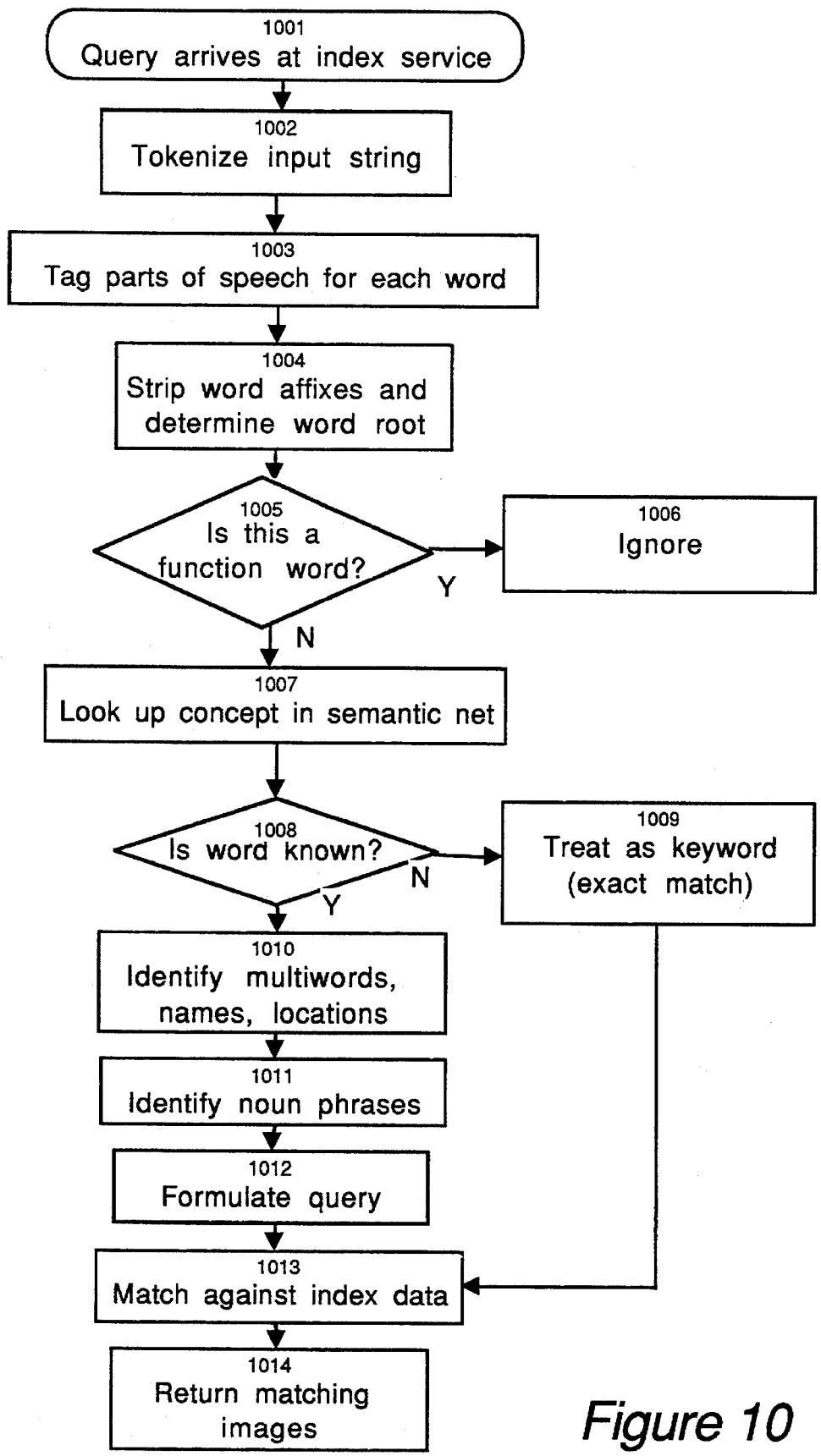
FIG. 10 is a flow diagram of search engine processing in accordance with the present invention.

Referring now to FIG. 10, there is shown a flow diagram for a search engine process in accordance with the present invention. Processing begins by a query arriving 1001 at the index service. In a preferred embodiment, search engine processing is primarily accomplished by operation of browse processor 126, although some portions are also accomplished by database processor 124 and a user workstation, e.g., 130. User input is obtained concerning the type of image that the user desires. For example, a user may type a query in ordinary English, such as "red trucks". Additionally, a user may enter query data into bibliographic fields, specifying, for example, images produced by a particular artist or agency. Finally, a user may also limit a query based on image characteristics such as predominant hue or image type, as described above in connection with FIG. 6. User queries may include standard Boolean connectors for interpretation in a conventional manner. A conventional user interface screen prompting the user to provide image specifications, as well as bibliographic data and image characteristics, is used to obtain such query information. The user may provide as much or as little information as desired, based on the user's requirements.

Once a user forms a complete query, it is sent to the index server 306 for processing. Any image characteristics in the query and bibliographic information in the query are processed as in conventional keyword search techniques. In a preferred embodiment, conventional keyword search techniques for bibliographic information are supplemented in several ways. First, bibliographic information pertaining to location of an image is stored in a location database and processed so that precise locations are tagged with more general location data. For example, an image of the Eiffel Tower may include bibliographic data stating the location as "Paris", but when stored in database processor 124, this location information will be encoded as "Paris, France" because an association has previously been entered into the database between Paris and France. Similarly, "Los Angeles" would be associated with "California" and "United States." A second related way in which conventional keyword searching is enhanced is by associating names and spellings with their common variants. Thus, nicknames "Beth", "Betsy" and "Liz" are associated with "Elizabeth". Similarly, "Stephen" and "Steven" are associated. Yet a third way in which enhancement over traditional keyword searching is achieved is by recognizing dates in any one of several formats, e.g., "March 17, 1994" or "17 March 1994" or 3/17/94" or "17 Mar 94" or "March 1994" or "1994".

Processing of the "free text" portion of a query for matching with captions or suggests field entries proceeds by tokenizing 1002 the input string of the query so that it is divided into a number of individual tokens, which may be single words or multiwords.

In order to determine whether a word should be treated independently or as part of a multiword, a variation of conventional pattern matching is used. Specifically, if a single word is recognized as matching a word that is part of a stored multiword, a decision on whether to treat the single word as part of a multiword is made based on the contents of the stored pattern and the input pattern. Stored patterns include not just literal words, but also syntactic categories (e.g., adjective, non-verb), semantic categories (e.g., nationality, verb of motion), or exact matches. If the input matches, or comes close to matching, the stored pattern information, then the input is interpreted as a multiword rather than independent words. Further explanation of such pattern matching is provided in C. Aone et al., SRA: DESCRIPTION OF THE SOLOMON SYSTEM AS USED FOR MUC-4, *Proceedings of the Fourth Message Understanding Conference (MUC-4)*, sponsored by Defense Advanced Research Projects Agency, June 1992, McLean, Va., pp. 259–267, which is incorporated herein by reference.

A part-of-speech tagger then makes use of linguistic and statistical information to tag 1003 the parts of speech of incoming query portions. Implementation of such taggers is well known and is described, for example, in Strzalkowski (1993) incorporated by reference above. Only words that match by part of speech are considered to match, and if two or more parts of speech are possible for a particular word, it is tagged with both.

After tagging 1003 parts of speech, word affixes (i.e., suffixes) are stripped 1004 from query words to obtain a word root, in accordance with conventional inflectional morphology. If a word in a query is not known, affixes are stripped from the word one-by-one until a known word is found. If such a root word is found, the word is understood to mean the root word, plus any information that may be gleaned from the stripped affix. For instance, the word "walked" is stripped to "walk", and the "ed" affix is interpreted as past tense. Further details on implementing such affix-stripping functionality is provided in Strzalkowski (1993), incorporated by reference above. In an alternative embodiment, derivational morphology is used for affix-stripping.

Processing then checks 1005 to determine whether the resulting word is a function word or a content word. If it is a function word, it is ignored 1006. If not, the concepts of that word in each of its senses are retrieved 1007 from a semantic net database portion of database processor 124.

In retrieving concepts 1007, not only single words, but groups of words, are processed. To begin with, words are grouped based on identified parts of speech to obtain noun phrases consisting of adjacent nouns and adjectives. For instance, the adjacent words "window glass" in a query are grouped to form a noun phrase. Then, a head noun is identified as that noun which is most salient in the phrase, based on the relative position of the words in the phrase. In the "window glass" example, "glass" would be the head noun because of its position after "window". A second grouping of words or noun phrases is used to identify subjects and objects in a query. It should be recognized that this identification may be based not only on relative positions of words, but also on whether the verb linking two noun phrases is active or passive and other sentence information, e.g., whether the verb is a "middle" verb as in "The window broke" (i.e., got broken) as opposed to "The hammer broke the window" (which is understood to mean that the window, not the hammer, got broken). Using these techniques, distinction is possible between similar looking query pairs "window glass" and "glass window", "red fish in blue coral" and "blue fish in red coral", and "man bites dog" and "dog bites man." Further description of such syntactic processing in the context of text retrieval systems is found in the two Strzalkowski articles incorporated by reference above.

Once concepts are retrieved 1007, a check 1008 is made to determine whether the word root is known by database processor 124. If not, the word is treated 1009 as a keyword, requiring an exact match. Otherwise, the word is identified 1010, as a special type of word as appropriate. Multiwords are identified so that they may be matched as a whole unit rather than independent words to prevent, for instance, a query for "prairie dogs" retrieving with strong weighting a caption reading "In the prairie dogs frolic". Similarly, names and locations are identified so that the separate name and location database portions may be searched for such terms. Next, noun phrases and other syntactical information is identified 1011, as appropriate. Thus, information is obtained 1010 or 1011 as to both types of words, e.g., multiwords, names, or locations, and syntax.

An intermediate query is then formulated 1012 to match 1013 against information stored in database processor 124 corresponding to stored images. This formulation includes recognizing that the juxtaposition of certain words implicitly imposes Boolean relationships. For example, a sentence that reads "A black cat . . . " may be interpreted so as to formulate an intermediate query of the form "black AND cat . . . " so that retrieved images have both the concept "black" and the concept "cats". Explicitly stated Boolean relations are interpreted as written by treating words such as "AND", "OR", "BUT", "WITHOUT", "EXCEPT", and "NOT" as concepts for linking search terms rather than as search terms.

Captions that match queries are then returned 1014, ranked and displayed to the user, with those captions that match the query best being placed at the top of the list, and with matches of equal weighting being randomized so that no one of such images receives more prominent display than others time after time. The determination of whether a caption matches a query and which captions match better than others is made by the use of weights corresponding to the associations made between words and related concepts, and by weights corresponding to the number and location of matching elements. For instance, if a query includes the word "car" and a match is found based on the related concept "automobile", that would be considered a very strong match because "car" and "automobile" are synonyms. If, however, the match to the query word "car" was found based on the weakly related concept "transmission", that would be considered a weaker match. Weight data for related concepts is maintained in a weight database portion of database processor 124.

As with other known semantic net retrieval systems, matches among less common elements are considered more important than matches among more common elements. For example if the query contains the words "man" and "xylophone", matches of "xylophone" are given a higher ranking than matches of "man."

Similarly, syntactic information is used for weighting after the word-by-word processing so that a noun phrase that forms the subject in the first sentence is given more weight than, say, a word in a noun phrase that is part of the object of the second sentence of a caption. In one embodiment, the first sentence of a caption is weighted more strongly than subsequent sentences, and heads of noun phrases are weighted more heavily than modifiers, nouns are considered more important than other parts of speech, subjects are considered more important than objects, both subjects and objects are given greater weight than obliques, i.e., indirect objects and objects of prepositional phrases.

Once some matching captions are retrieved for the user and reviewed along with their corresponding images, further searches may be made by the user specifying selected matches that come most close to the desired image. Those matches are then used to generate second-level queries, and the process may continue iteratively as desired by the user. Such querying by example may, in one embodiment, encompass two modes. In a first mode, the caption of a retrieved image is used directly as the query for a subsequent search. In a second mode, the bibliographic data for a retrieved image are used as a query so that images with similar bibliographic data are retrieved. From a user's perspective, such iterative querying is implemented by selecting the desired image using mouse clicks, and dragging the image into either the structured description area or the bibliographic area of the screen. The caption or the bibliographic data from the selected image is then copied to form the new query, just as if the same information had been input directly by the user, and the user may make further additions, deletions, or modifications to this information as desired.

In one embodiment, the searching discussed above in connection with FIG. 10 is implemented by first building a B-tree of "ID lists", one for each concept in the database of captions. ID lists have an entry for each image object whose description contains a reference to the given concept. An entry consists of an image ID and a weight. The image ID provides a unique identifier of the image object and is a positive integer assigned at the time that the image object is indexed. The weight reflects the relevancy of the concept to the image object description and is a positive integer determined by the expansion process described above. A weight range of 0 to 100 is used in this embodiment, although it should be recognized that other weight ranges could be used. For instance, a weight range of 0 to 100,000 could be used to achieve greater ranking discrimination. ID list entries are sorted by image ID, from smallest to largest, within a given ID list.

To add an image description to an existing index, the image ID and a weight are inserted into the ID list of every concept that is in any way relevant to the description. For searching, the ID lists of every concept in the query are retrieved and combined according to the Boolean operations indicated by the query. Since ID lists contain IDs with weights in sorted order, the Boolean operations determine both the existence and relevancy at the same time and with great speed, using only a small number of processor instructions per concept-image pair.

Boolean operators implemented in this embodiment include OR, AND, NOT and "non-exclusive AND". The rank of an ORed image object is the maximum of its weight in the two operand lists, while it is the sum for AND image objects. NOT has no effect on weights. Non-exclusive AND affects the left hand operand only by incrementing the weights of any IDS that are in common with the right hand operand, but does not compute the intersection. Thus, finer control of relevancy ranking is achieved by augmenting image weights without performing a strict intersection of search terms.

In an extension of the embodiment described above, ID lists are generalized to handle relations between concepts in an image description. Arbitrarily complex relations between numerous concepts are representable in a single index database and image objects with similar relations can be found quickly and ranked. Each relation type consists of an arbitrary number of unique constituents or "roles". Some of such roles are required for the existence of a particular type of relation, while others are optional. The key used to store and retrieve the ID list of a constituent concept is based both on the concept and its role in the relation, rather than just the concept. Each different instance of the same relation type within an image description is assigned a unique "group number", stored along with the ID and weight in the ID list. ID lists for relations thus include the image ID, group number and weight. During retrieval, an AND operation is applied to the ID lists of the concepts that make up the required roles, while a non-exclusive AND operation is applied to the remaining ID lists. Within the AND, OR, NOT and non-exclusive AND of relation indexing, the image ID and group number together are considered as a unique identifier, so a given image ID may occur multiple times in a list with different and unique group numbers. With these ideas of roles, groups, and modified Boolean operations, an unlimited number of relation types can be saved and retrieved from the same database with all the benefits of ID list indexing discussed above. Also, the same role can appear in multiple relations and needs to be stored once, and new relations between existing roles can be implemented on an index without changing the index.

An extension to relation indexing is the use of compound relations—relations between relations and concepts. The required roles of a compound relation are those of the constituent relations as well as any new required roles introduced by the compound relation. Saving and retrieving of compound relations are performed as with other relations.

A further extension to custom indexing is an option of changing the order of concept expansion. Rather than expanding concepts before adding them to the index during upload processing, the concepts in the query are expanded. Since the implicit weight of non-expanded concepts is 100 (or whatever the maximum is), weights do not need to be stored with each ID list entry. An entry consists of an image ID for concept indexing, and an image ID and a group for relation indexing. During the retrieval process, concepts in the query are expanded and assigned weights. The ID lists corresponding to these expanded concepts are retrieved from the database, the assigned weights are applied to the entries of each ID list, and an exclusive OR operation is performed on the expanded concept ID lists and the query concept itself (which has a weight of 100). The result is then constructed as described above. Using this extension, storage requirements are reduced at the cost of increased processing. Furthermore, this extension facilitates control over the extent of expansion, or so-called "fuzziness" in the search, as the user may desire.

Figure 11:
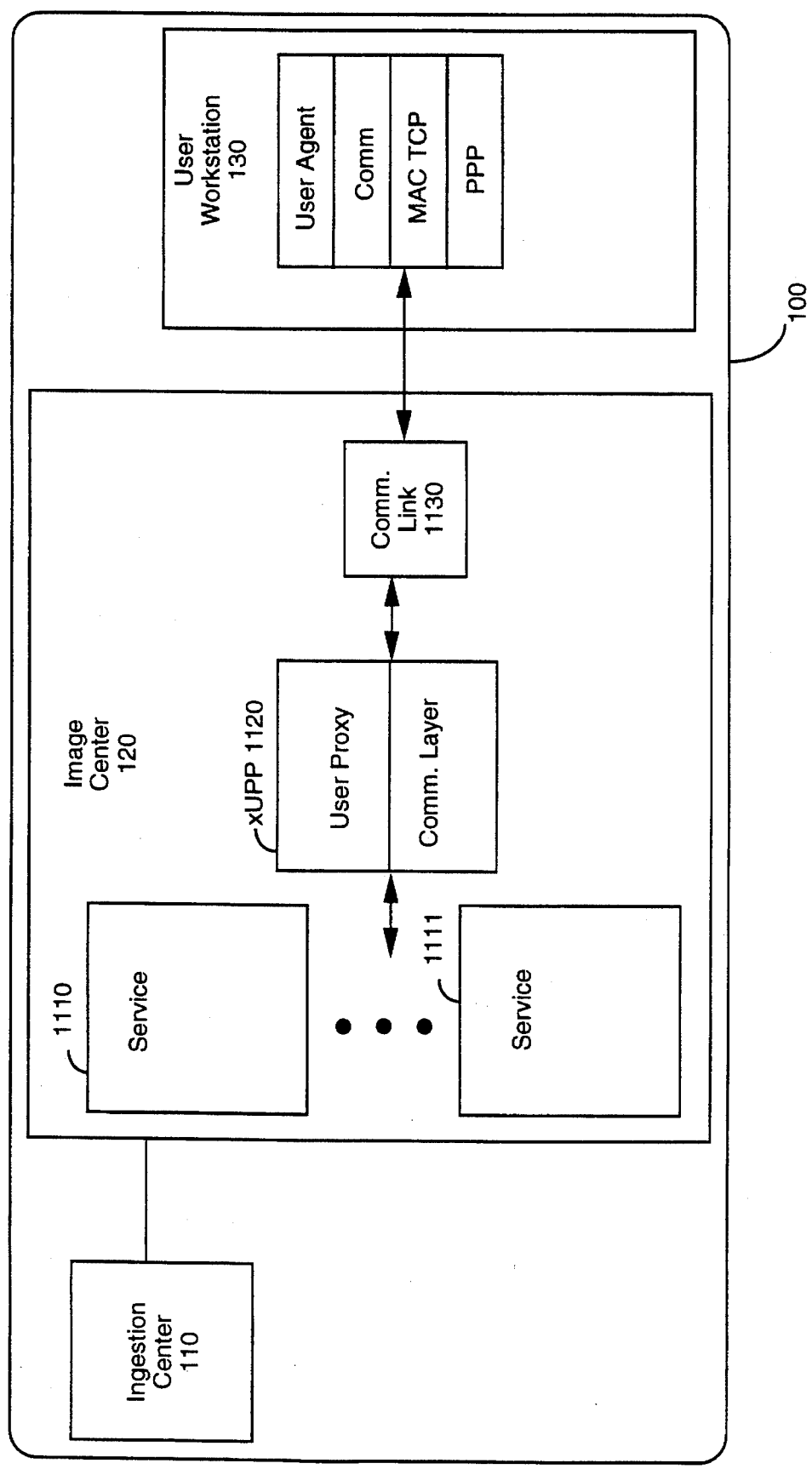
FIG. 11 illustrates communications layers of the apparatus of FIG. 1, in accordance with the present invention.

Referring now to FIG. 11, there are shown communication layers used in system 100. Two levels of communications are provided for image center 120. The first layer concerns communications between users, e.g., user workstation 130, and the image center 120. The second layer concerns communications between clients, e.g., user agent facilities within user workstation 130, and servers, e.g., browse processor 126.

In a preferred embodiment, a user workstation connects to image center 120 by use of a communications link 1130, e.g., a modem, using conventional protocols. An additional client 1120 following the xUPP protocol acts as a communications manager to route communications from user workstation 130 to an appropriate service, e.g., 1110, 1111. In one embodiment, a single client 1120 is used for multiple user workstations. In an alternate embodiment, a separate client 1120 is provided for each user workstation 130. TCP is used in a conventional manner for communication between the user agent of workstation 130 and xUPP processor 1120. Conventional communications applications provide intermediate layers of communication protocol.

Figure 12:
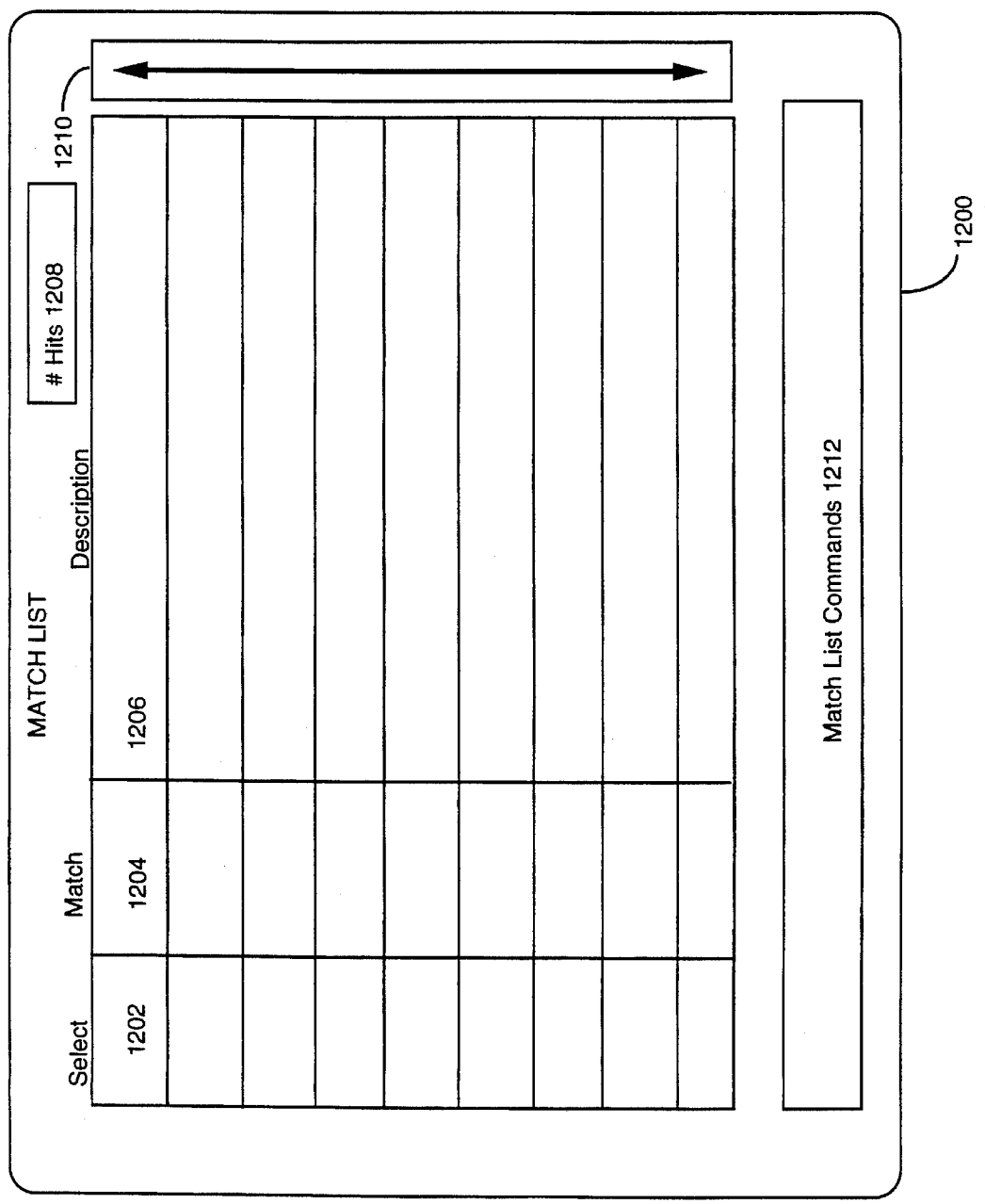
FIG. 12 illustrates a match list screen used in conjunction with the image center portion of the apparatus of FIG. 1, in accordance with the present invention.

Referring now to FIG. 12, there is shown a match list screen 1200 that is displayed to a user upon completing search engine processing as described in connection with FIG. 10. Screen 1200 displays the number of hits 1208 generated as a result of the search, provides a number of "select" buttons, e.g., 1202 by which the user can choose certain candidate matches for further examination, and provides a color coded "match" area 1204 for each hit that indicates the relative strength of the match for that hit. In a preferred embodiment, the more of the color blue that appears in the "match" area 1204, the stronger the hit. A "description" area 1206 presents the caption for each hit. A conventional scroll bar 1210 permits the user to view additional hits. A match list commands area 1212 provides buttons for the user to select all hits, indicates whether more hits than a preselected maximum number were found, allows the user to view those additional hits, and provides a "view" button to allow the user to enter "browsing" mode to browse the images of the hits that the user has selected. User interface selections in match list commands area 1212 also permit the user to alter the display to provide additional information about the matches, such as bibliographical information.

Figure 13:
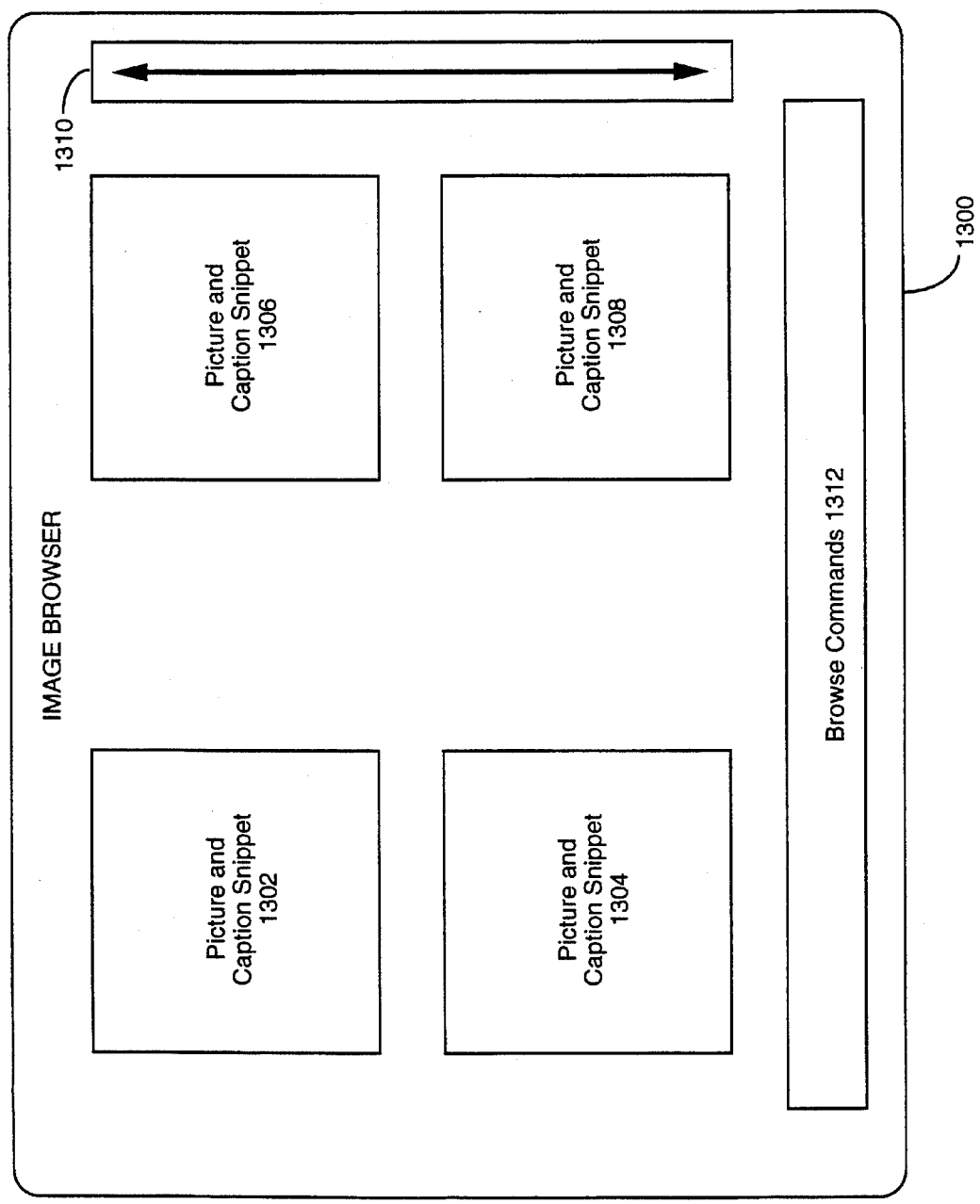
FIG. 13 illustrates an image browser screen used in conjunction with the image center portion of the apparatus of FIG. 1, in accordance with the present invention.

Referring now to FIG. 13, there is shown an image browser screen 1300 that is displayed to the user when the view button is selected from screen 1200. The browser displays "thumbnail" versions 1302, 1304, 1306, 1308 of the images the user selected in the match list screen 1200, as well as the first line of the caption (a caption "snippet") from each such image. The user may view the full caption for any picture and caption snippet, e.g., 1302, by placing a cursor over the snippet and clicking on a mouse button. A larger version of any picture may be displayed by placing a cursor over the picture portion of a picture and caption snippet, e.g., 1302, clicking a mouse button once, and then clicking on a "full-size" or "quarter-size" button in browse commands area 1312. Bibliographic information may similarly be obtained by clicking once on a picture and caption snippet, e.g., 1302, and then clicking on an "info" button in browse commands area 1312. Scroll bar 1310 allows the user to view additional images.

Figure 14:
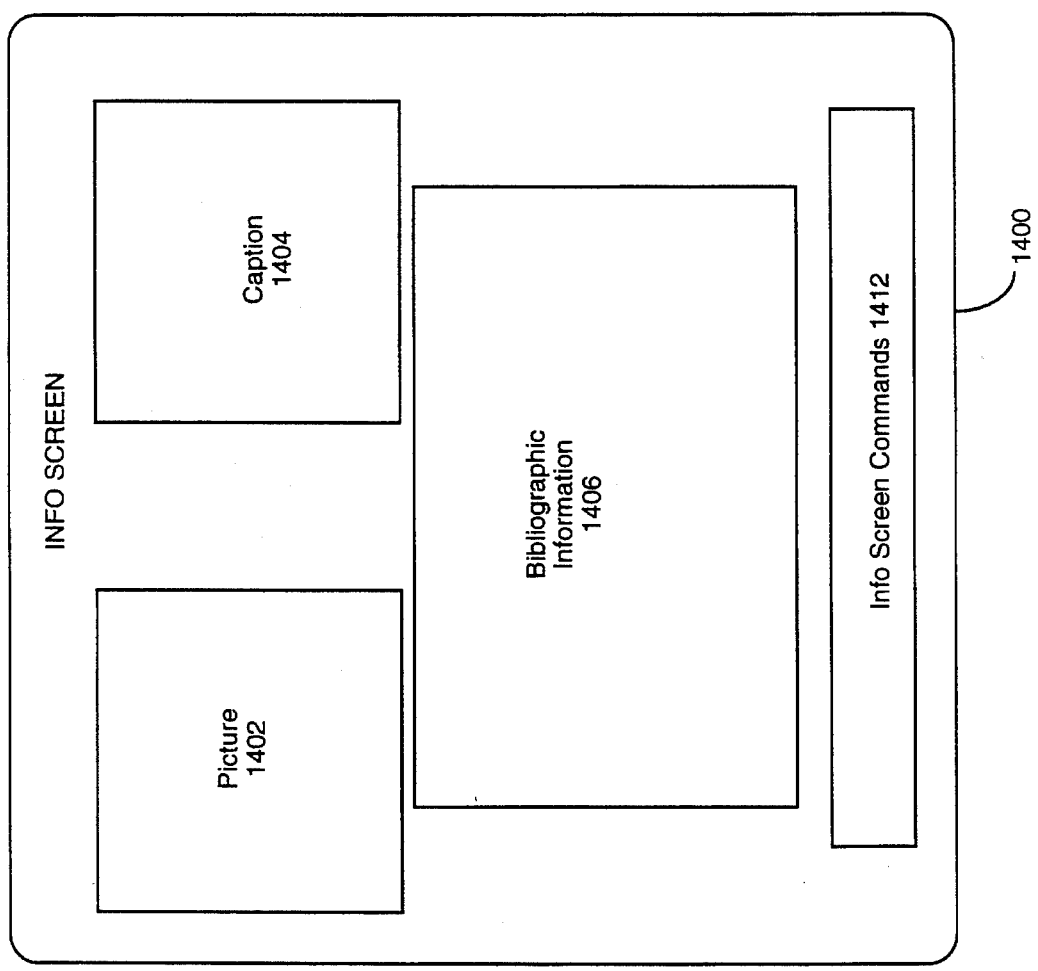
FIG. 14 illustrates an information screen used in conjunction with the image center portion of the apparatus of FIG. 1, in accordance with the present invention.

Referring now to FIG. 14, there is illustrated the info screen 1400 that is displayed if the user clicks on the "info" button in screen 1300. Info screen 1400 displays a small version of the selected picture 1402, the complete caption 1404 for the picture, and the complete bibliographic information for the picture 1406. Info screen commands area 1412 displays buttons by which the user may see the picture in quarter-size or full-size, and by which the user may obtain pricing information for the picture.

Figure 15:
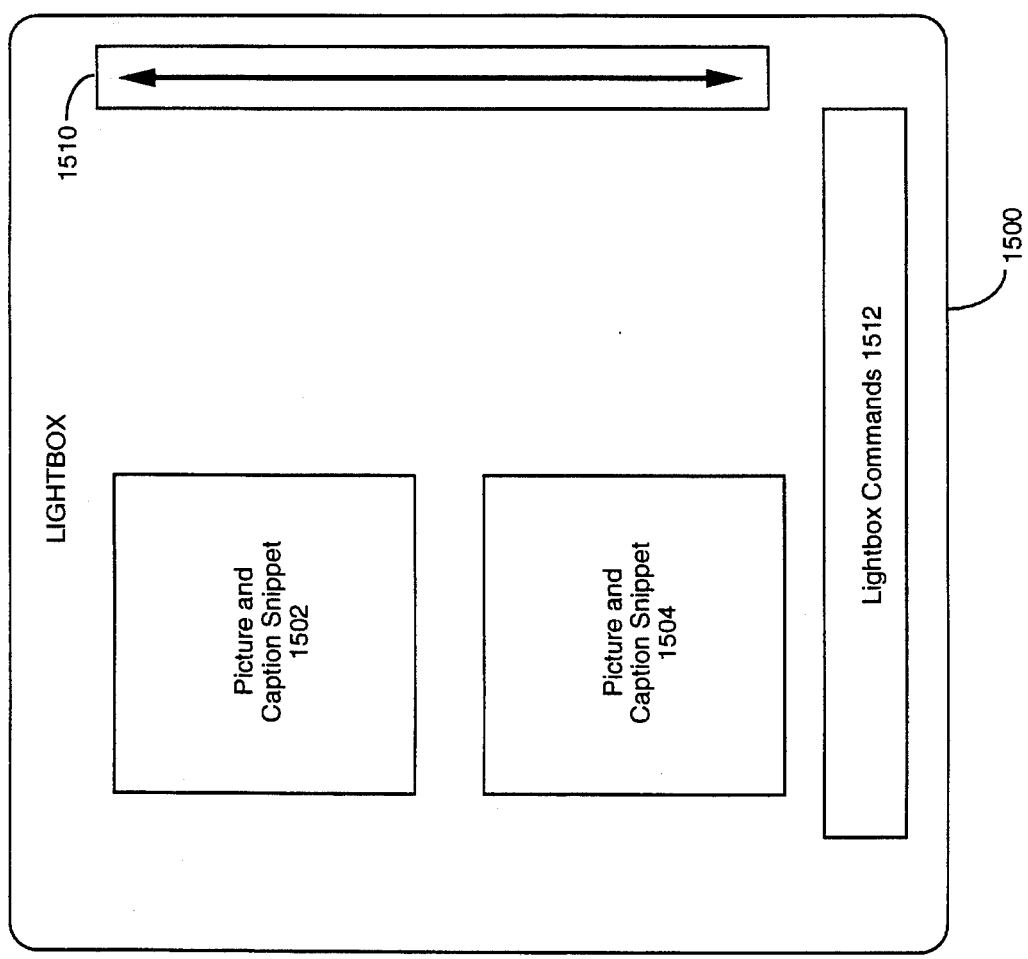
FIG. 15 illustrates a lightbox screen used in conjunction with the image center portion of the apparatus of FIG. 1, in accordance with the present invention.

Referring now to FIG. 15 there is shown a lightbox screen 1500 that is displayed when the user selects a "lightbox" button from browse commands area 1312 of screen 1300. Lightbox screen 1500 allows a user to select an image from browse screen 1300 and save it for later examination in lightbox screen 1500. When lightbox screen 1500 is displayed, a user may double-click on a picture and caption snippet, e.g., 1502, 1504, to obtain information, provided by info screen 1400, related to the selected image. As with the other screens, lightbox screen 1500 provides a scroll bar 1510 and also provides user commands via lightbox commands area 1512. The available commands are export of a selected image to a hard disk file, pricing information for an image, a notepad area for user notes concerning an image, and a command to delete a selected picture and caption snippet, e.g., 1502, from the lightbox screen 1500.

Figure 16:
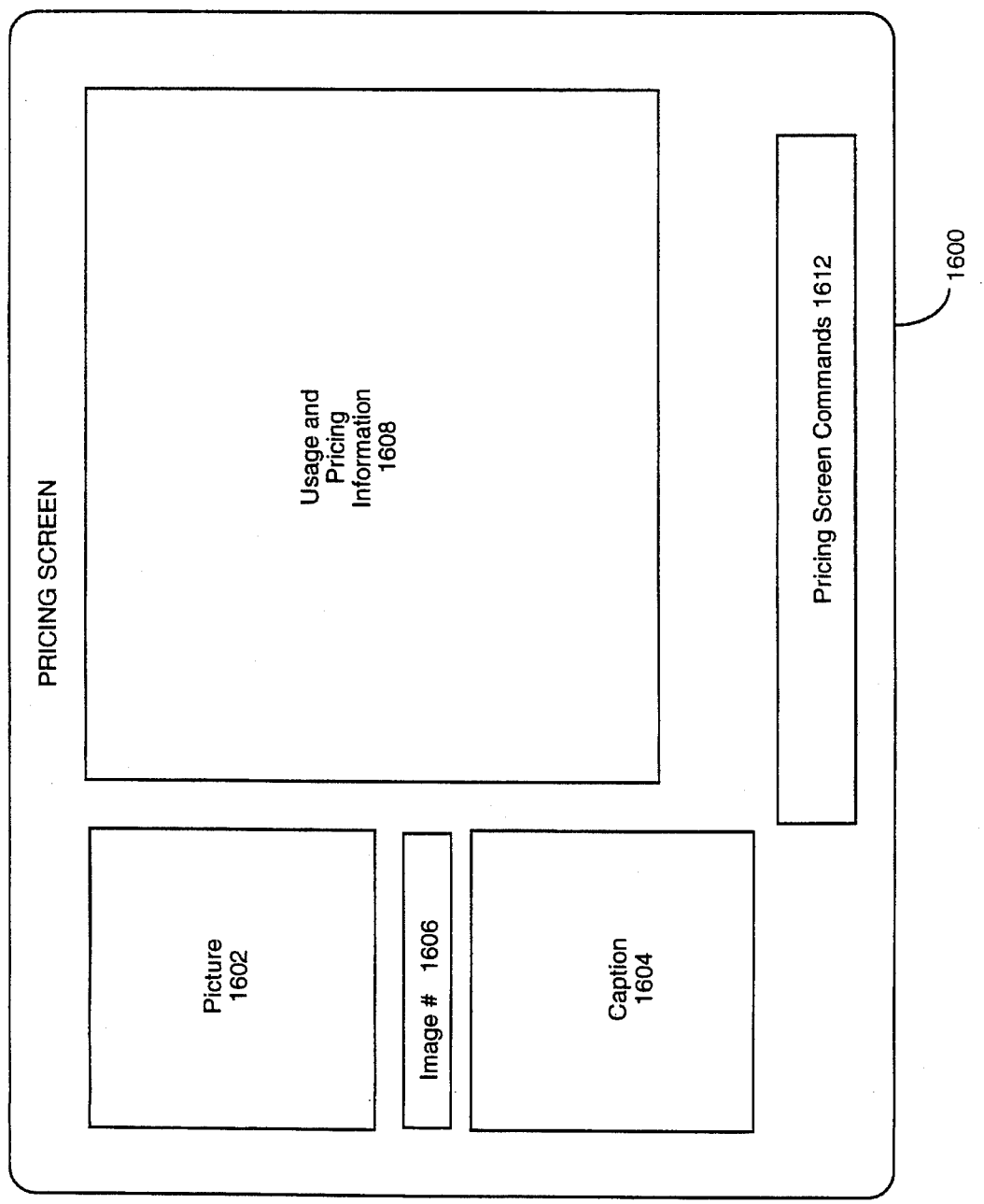
FIG. 16 illustrates a pricing screen used in conjunction with the image center portion of the apparatus of FIG. 1, in accordance with the present invention.

Referring now also to FIG. 16, if the user selects the pricing button from lightbox commands area 1512 or info screen commands area 1412, pricing screen 1600 is displayed, enabling the user to purchase rights to, and obtain delivery of, selected images through purchase/delivery service 310 of FIG. 3 using order processor 128 of FIG. 1. Screen 1600 displays a small version of the picture 1602, a unique number by which the image is indexed in area 1606, the full caption 1604 of the image, and usage and pricing information 1608 relating to the image. A pricing screen commands area 1612 permits the user to order an image, attach messages to an order negotiation request, or cancel the current session. Usage and pricing information displays the prices and other terms under which the image may be licensed, based on conventional factors such as the size of the intended display of the image, the circulation of any newspaper or magazine in which the image is to be used, and so forth. Once the user specifies all of the requested information concerning the intended use of the image, the license fee for the image is either determined by application of the entered information to an agent-provided pricing table, or a message is displayed that the artist or agent has stipulated that the desired use calls for negotiation of a price. In the latter instance, the user may initiate the negotiation process and may, using a button on the pricing screen commands area, send a message along with the negotiation request.

If the image does not require further negotiation, the user may specify ordering information such as desired format of the image file and delivery information. The user may receive the image file electronically, or it may be sent in film or slide form from the stock agency. For electronic delivery, a conventional bulletin board service is employed to allow the user to obtain the full resolution image. A file corresponding to the full resolution image is transferred from the storage medium on which it was archived, and placed, using database processor 124 and order processor 128, onto the bulletin board for retrieval by the user. In a preferred embodiment, the user is notified before finalizing the order of the full scope of the license to use the desired image, and of other legal issues concerning use of the image, such as copyright considerations and rights of publicity that may be involved. Order processor 128 operates conventionally to prepare bills and other financial documents pertaining to licensing transactions completed over system 100.

Therefore, image archiving and retrieval is achieved by associating metadata with images, using natural language processing to search for images corresponding to a query, and providing ordering and delivery of selected full-resolution images.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention. For instance, it should be recognized that the term "image" or "picture" herein should be interpreted to mean not only "photograph", but any object capable of multimedia presentation, whether a photograph, graphic drawing, video clip, audio clip, motion picture, animation, or other object.

We claim:

1. A system for archiving and retrieving images, the system comprising:

an ingestion center including (i) a data entry device for accepting as input an image and metadata, the metadata including bibliographic data associated with the image, a caption associated with the image and a set of suggestions evoked by the image; (ii) a natural language processing database including a plurality of terms; and (iii) a disambiguation processor operatively connected to the data entry device and to the natural language processing database, adapted to permit user selection of characteristics of portions of the metadata responsive to the plurality of terms;

an image center including (i) an upload processor operatively connected to the ingestion center and adapted to receive as input the image and the metadata; (ii) a database operatively connected to the upload processor for storing the image and metadata with other images and other metadata; and (iii) a browser operatively connected to the database for viewing a selective subset of the image and the other images responsive to correspondence of a query request with the metadata and other metadata.

2. A system as in claim 1, wherein the image center further includes a client workstation operatively connected to the browser and adapted to allow a user to enter the query request.

3. A system as in claim 1, wherein the image center further includes a purchase processor operatively connected to the database and adapted to accept a request to purchase a selected one of the image and other images.

4. A system as in claim 1, wherein the image center further includes a delivery processor operatively connected to the database and adapted to accept a request to deliver a selected one of the image and other images.

5. A system as in claim 1, wherein the ingestion center further includes a watermarking processor adapted to modify the image applied to the data entry processor to allow display of the image in a first manner and to prevent display of the image in a second manner.

6. A system as in claim 1, wherein the browser is adapted to accept as input an exemplar query request for a new subset of images corresponding to an identified one of the selected subset of images.

7. A computer-implemented process for archiving and retrieving images, the process comprising:
   a) associating metadata with an image, the metadata including bibliographic data associated with the image, a caption associated with the image, and a set of suggestions evoked by the image;
   b) removing ambiguities from the metadata;
   c) storing the image and the metadata in a database with other images and other metadata;
   d) selecting a subset of the image and the other images responsive to correspondence of a query request with the metadata and other metadata.

8. A computer-implemented process as set forth in claim 7, wherein the removing ambiguities includes determining, for a portion of the caption having a plurality of senses, which one of the senses corresponds to the portion of the caption.

9. A computer-implemented process as in claim 8, further comprising defining, responsive to lack of correspondence between any one of the senses and the portion of the caption, a new sense corresponding to the portion of the caption.

10. A computer-implemented process as in claim 7, further comprising selecting, subsequent to (d), a new subset of images responsive to an exemplar query request for images corresponding to an identified one of the selected subset.

11. A computer-implemented process as set forth in claim 7, wherein removing ambiguities involves highlighting portions of the metadata that are recognized as having multiple senses, providing a list of possible senses for the portion, and allowing user input of a new sense for the portion.

12. A computer-implemented process as set forth in claim 7, wherein removing ambiguities includes grouping portions of the metadata into multiword phrases responsive to user selection of the portions.

13. A computer-implemented process as set forth in claim 7, wherein selecting includes comparing a first order of components of the search request with a second order of portions of metadata.

14. A computer-implemented process as set forth in claim 7, further comprising requesting delivery, after (d), of one of the subset of images.

* * * * *